US012084596B2

United States Patent
Nejad et al.

(10) Patent No.: US 12,084,596 B2
(45) Date of Patent: Sep. 10, 2024

(54) NANOTUBE-ENCAPSULATED UV STABILIZERS

(71) Applicant: BOARD OF TRUSTEES OF MICHIGAN STATE UNIVERSITY, East Lansing, MI (US)

(72) Inventors: Mojgan Nejad, Okemos, MI (US); Saeid Nikafshar, East Lansing, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 325 days.

(21) Appl. No.: 17/606,107

(22) PCT Filed: Apr. 23, 2020

(86) PCT No.: PCT/US2020/029432
§ 371 (c)(1),
(2) Date: Oct. 25, 2021

(87) PCT Pub. No.: WO2020/219618
PCT Pub. Date: Oct. 29, 2020

(65) Prior Publication Data
US 2022/0195211 A1    Jun. 23, 2022

Related U.S. Application Data

(60) Provisional application No. 62/839,532, filed on Apr. 26, 2019.

(51) Int. Cl.
*C09D 7/48* (2018.01)
*C08K 7/00* (2006.01)
(Continued)

(52) U.S. Cl.
CPC .............. *C09D 7/48* (2018.01); *C08K 7/00* (2013.01); *C08K 9/10* (2013.01); *C09D 163/00* (2013.01);
(Continued)

(58) Field of Classification Search
CPC .......... C09D 7/48; C09D 163/00; C08K 9/10; C08K 5/00; C08K 5/005; C08K 7/00;
(Continued)

(56) References Cited

U.S. PATENT DOCUMENTS

2007/0292459 A1    12/2007    Cooper et al.
2013/0078293 A1    3/2013    Suh et al.
(Continued)

OTHER PUBLICATIONS

Cantwell et al., Persistant Organic Pollutants (POPs): Analytical Techniques, Environmental Fate and Biological Effects, Comprehensive Analytical Chemistry, 2015, pp. 513-514.*
(Continued)

*Primary Examiner* — Camie S Thompson
(74) *Attorney, Agent, or Firm* — MARSHALL, GERSTEIN & BORUN LLP

(57) ABSTRACT

The disclosure relates to encapsulated UV (ultraviolet) stabilizer/absorber nanoparticles, which nanoparticles limit or prevent the migration of UV stabilizers/absorbers to the surface of a coating in service and/or which otherwise preserve the UV-resistance properties of the UV stabilizer for a longer period once incorporated into a UV-protective coating. The nanoparticles each include a clay or other nanotube encapsulating body such as a halloysite nanotube (HNT) and a UV stabilizing material within the interior cylindrical volume of the nanotube encapsulating body. The UV stabilizing/absorbing material can include one or more of lignin, a biomass extractive, a phenolic biomass material, and an organic UV stabilizer. The encapsulated UV stabilizer nanoparticles can be incorporated into a polymer
(Continued)

composite as a heterogeneous phase distributed throughout a continuous polymer matrix. The polymer composite can be applied as a coating or film to an underlying substrate to form a corresponding coated article.

15 Claims, 9 Drawing Sheets

(51) Int. Cl.
  *C08K 9/10* (2006.01)
  *C09D 163/00* (2006.01)
(52) U.S. Cl.
  CPC .. *C08K 2201/003* (2013.01); *C08K 2201/011* (2013.01)
(58) Field of Classification Search
  CPC ........ C08K 2201/011; C08K 2201/003; B82Y 30/00; C08L 63/00
  USPC ........................................................ 442/133
  See application file for complete search history.

(56) References Cited

U.S. PATENT DOCUMENTS

2015/0099078 A1  4/2015  Fish
2017/0204288 A1  7/2017  Seeger et al.

OTHER PUBLICATIONS

Abdullayev et al., Halloysite tubes as nanocontainers for anticorrosion coating with benzotriazole, ACS Appl. Mater. Interfaces, 1(7):1437-43 (Jul. 2009).

Beisl et al., Lignin from Micro- to Nanosize: Applications, Int. J. Mol. Sci., 18(11):2367 (Nov. 2017).

Chung et al., The persistence and photostabilizing characteristics of benzotriazole and 5-methyl-1H-benzotriazole reduce the photochemical behavior of common photosensitizers and organic compounds in aqueous environments, Environ. Sci. Pollut. Res. Int., 25(6):5911-20 (Feb. 2018).

European Patent Application No. 20795842.2, Extended European Search Report, dated Dec. 15, 2022.

He et al., pH-Responsive nanovalves based on encapsulated halloysite for the controlled release of a corrosion inhibitor in epoxy coating, RSC Advances, 5:90609-20 (2015).

Liu et al., Synthesis and characterization of controlled benzotriazole light stabilizer by RAFT polymerization and its application, J. Polymer Res., 25(4):97 (Mar. 2018).

International Application No. PCT/US2020/029432, International Search Report and Written Opinion, mailed Jul. 14, 2020.

Lvov et al., Halloysite clay nanotubes for loading and sustained release of functional compounds, Adv. Mater., 28(6):1227-50 (2016).

Qian et al., Lignin: a nature-inspired sun blocker for broad-spectrum sunscreens, Green Chemistry, 17:320 (2015).

* cited by examiner

— scale

— scale

— scale

— scale

— scale

— scale

— scale

— scale

— scale

— scale

— scale

— scale

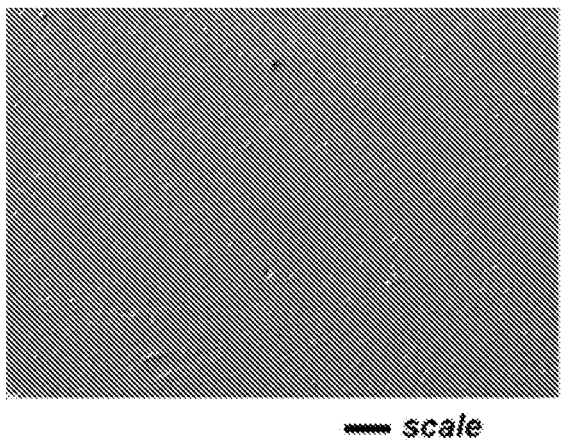
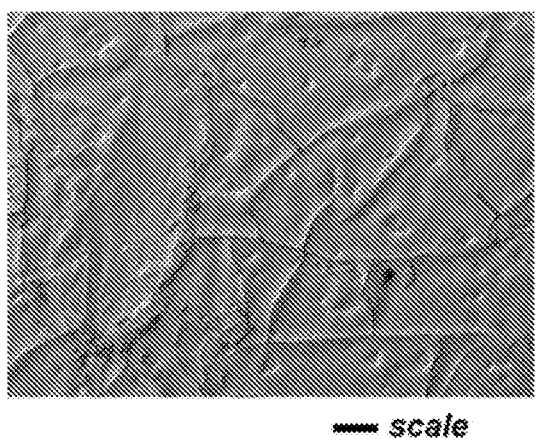
FIG. 4A
FIG. 4B
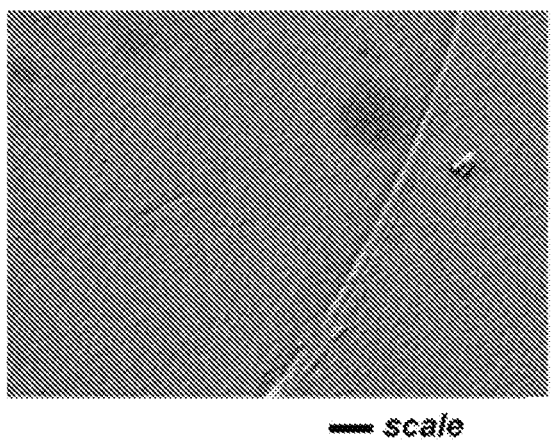
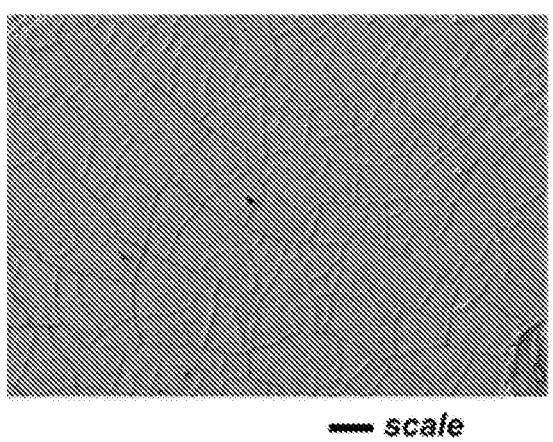
FIG. 4C
FIG. 4D
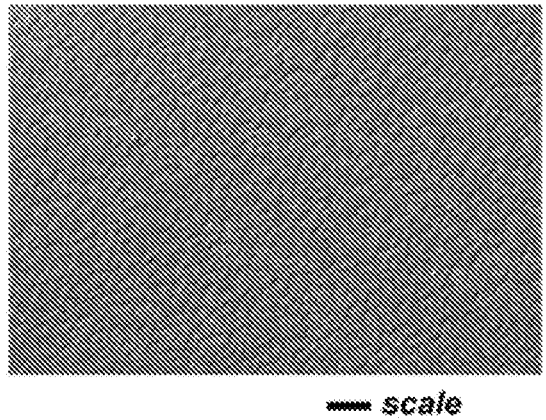
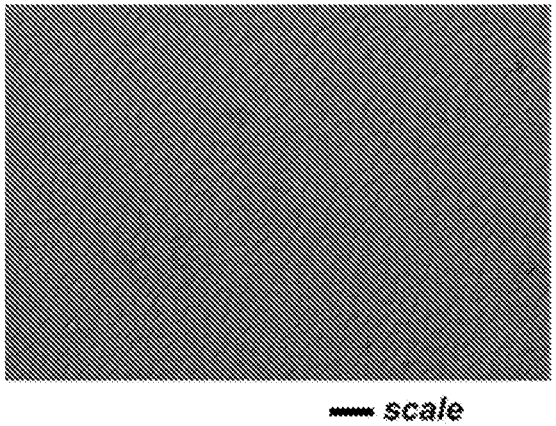
FIG. 4E
FIG. 4F — scale — scale — scale — scale — scale — scale

NANOTUBE-ENCAPSULATED UV STABILIZERS

CROSS REFERENCE TO RELATED APPLICATION

This application is a National Stage application of International Application No. PCT/US20/29432, filed Apr. 23, 2020, which claims priority to U.S. Provisional Patent Application 62/839,532, filed Apr. 26, 2019, the entire disclosures of both of which are incorporated herein by reference.

STATEMENT OF GOVERNMENT INTEREST

None.

BACKGROUND OF THE DISCLOSURE

Field of the Disclosure

The disclosure relates to encapsulated UV (ultraviolet) stabilizer nanoparticles, which nanoparticles preserve the UV-resistance properties of the UV stabilizer/absorber for a longer period once incorporated into a polymer matrix for UV-protection. The nanoparticles each include a clay or other nanotube encapsulating body such as a halloysite nanotube (HNT) and a UV stabilizing/absorbing material within the interior cylindrical volume of the nanotube encapsulating body.

Brief Description of Related Technology

Organic coatings, paints, transparent stains, and penetrating finishes or clear films are widely applied to protect and decorate different surfaces and buildings due to their low manufacturing costs, excellent chemical and mechanical properties, versatility, and aesthetic features. In particular, transparent systems can be used to show the natural features of the substrate (i.e., surface). However, like other polymeric materials, in outdoor conditions, these coatings are degraded by environmental factors such as UV light, oxygen, temperature, moisture, and pollutants that cause their bulk properties such as gloss, Young's modulus, hardness, and surface roughness to decline, as well as causing yellowing, chalking, delamination, and discoloration.

Among these factors, UV light is a major factor in the degradation of polymeric materials. Although only about 5% of the total radiation reaching to the earth's surface is UV light, these high energy radiations induce the formation of free radicals, causing chain scission and secondary oxidative reactions of polymeric chains. Aromatic and ether groups, in epoxy resins, are photo-initiating sites that are more susceptible to UV degradation. Therefore, one of the main challenges in the coatings industry is to formulate transparent epoxy coatings with exceptional UV stability for exterior applications.

The paint and color industries have been challenged for many years to make coatings which are light-stabilized. Solar radiation initiates weathering, and sunlight provides high intensity UV light, which causes the formation of free radicals on polymeric surfaces. Free radicals have an affinity for pairing with other electrons in the polymer structures, thereby breaking the covalent bonds of the polymer molecules and initiating extra polymerization and/or oxidation reactions. Other environmental factors such as humidity, temperature, oxygen, acidity/basicity, pollutants, and the like can accelerate this UV degradation phenomenon.

Therefore, throughout the life of these coatings the exposure to sunlight, heat, and temperature fluctuations can result in color changes, loss of gloss, and other surface defects such as cracking and delamination.

SUMMARY

In an aspect, the disclosure relates to a plurality of encapsulated UV stabilizer nanoparticles, each nanoparticle comprising: a nanotube encapsulating body having a cylindrical body defining an interior cylindrical volume; and a UV stabilizing material within the interior cylindrical volume of the encapsulating body, the UV stabilizing material comprising at least one of (i) a biomass material comprising a phenolic functional group and (ii) an organic UV stabilizer (e.g., UV absorbers, hindered amine stabilizer).

In another aspect, the disclosure relates to a plurality of encapsulated UV stabilizer nanoparticles, each nanoparticle comprising: a clay nanotube encapsulating body comprising halloysite and having a cylindrical body defining an interior cylindrical volume; and a UV stabilizing material within the interior cylindrical volume of the encapsulating body, the UV stabilizing material comprising at least one of lignin and an organic UV stabilizer (e.g., UV absorbers, hindered amine stabilizer).

A variety of materials are suitable for the nanotube encapsulating body, primarily based upon their nanotubular geometry, which in turn allows them to absorb, contain within their cylindrical interior, stabilize, and deliver UV stabilizing materials. The nanotube materials generally have a nanometer-scale diameter, a nanometer- or micron-scale length, and a large aspect ratio (e.g., at least 5 and/or up to 1000). Examples of such nanotube materials include halloysite nanotubes, carbon nanotubes (e.g., single-walled, multi-walled), silicon nanotubes, boron-carbon-nitride nanotubes, boron-nitride nanotubes, and combinations or mixtures thereof. Halloysite nanotubes are natural, clay-based nanotube materials that are geometrically suitable, chemically compatible with a variety of UV stabilizing materials and polymer matrix materials, and relatively inexpensive. Nonetheless, synthetic nanotube materials such as carbon nanotubes or otherwise also have suitable geometric parameters and chemical compatibility.

Clay materials suitable for use as the encapsulating body generally include hydrous aluminum phyllosilicates having a nanotube structure. Clay materials can include halloysite, kaolinite, illite, montmorillonite, vermiculite, talc, sepiolite, palygorskite (or attapulgite), and pyrophyllite. Halloysite is an aluminosilicate clay mineral with the empirical formula $Al_2Si_2O_5(OH)_4 \cdot 2H_2O$, and it can occur intermixed with dickite, kaolinite, montmorillonite and other clay minerals. Halloysite is in the form as small cylinders (nanotubes) in which the outer surface is mostly composed of $SiO_2$ and the inner surface primarily of $Al_2O_3$. Halloysite is commonly found with kaolinite, both are which are hydrated aluminosilicate minerals. Halloysite ($Al_2Si_2O_5(OH)_4 \cdot 2H_2O$) and kaolinite ($Al_2Si_2O_5(OH)_4$) have the same hydrated aluminosilicate formula, but halloysite has non-structural water intercalated between the aluminosilicate layers, which water causes a halloysite platelet to assume a tubular form (a "halloysite nanotube" or "HNT"), which is a natural nanotube. In contrast, kaolinite tends to remain in a planar form. Suitably, the majority of clay materials in the encapsulated UV stabilizer composition is in the form of the nanotubular shape formed from HNT. Suitably, at least 70, 80, 90, or 95 wt. % and/or up to 80, 90, 95, 98, 99, or 100 wt. % of the clay materials are in the form of clay nanotubes. For example, a clay material used to form the encapsulated UV stabilizer nanoparticles could have 70 wt. % halloysite nanotubes and 30 wt. % kaolinite or other non-nanotubular clay material.

Various refinements of the encapsulated UV stabilizer nanoparticles are possible.

The nanotube encapsulating body can be characterized by a variety of geometric/size parameters, for example corresponding to an average size property or size distribution property. In a refinement, the nanotube encapsulating body can be characterized as having one or more of (i) an internal diameter in a range from 10 nm to 100 nm, (ii) an outer diameter in a range from 40 nm to 400 nm, and (iii) a length in a range from 0.1 µm to 10 µm. For example, the internal diameter can be at least 10, 12, 15, 20, 25, 30, 40, or 50 nm and/or up to 50, 60, 70, 80, 90, or 100 nm. The outer diameter is larger than the internal diameter and can be at least 40, 50, 60, 80, 100, 150, or 200 nm and/or up to 50, 60, 80, 100, 150, 200, 250, 300, or 400 nm. The wall thickness (i.e., half the difference between outer and inner diameters) can be at least 5, 7, 10, 12, 15, 20, or 25 nm and/or up to 20, 25, 30, 40, 60, 80, 100, 120, or 150 nm. The length can be at least 0.1, 0.2, 0.5, 1, 1.2, 1.5, 2, or 4 µm and/or up to 1, 2, 4, 6, 8, or 10 µm. The aspect ratio (i.e., length divided by outer diameter) can be at least 5, 10, 20, 40, 60, 80, or 100 and/or up to 20, 50, 100, 200, 500, or 1000. The foregoing ranges can represent a distribution property of the nanoparticles, for example a size range within which at least 90, 95, 98, or 99% of the nanoparticles fall, for example on a number, weight, or volume basis. Similarly, a number-, weight-, or volume-average size (e.g., length, diameter, etc.) of a given nanoparticle can be within the foregoing ranges.

In a refinement, the UV stabilizing material comprises a biomass material comprising a phenolic functional group. A phenolic group includes an aromatic $C_6$ (benzene) ring substituted with at least one phenolic —OH (hydroxy) group. Phenolic groups can have single or multiple phenolic —OH (hydroxy) groups, for example including mono-, di-, or tri-hydroxy-substituted aromatic $C_6$ rings. The aromatic rings can include other functional groups, for example linking together multiple aromatic rings with phenolic groups together, such as in a polyphenolic compound. Such other functional groups or linking groups can include alkoxy groups, ether groups, alcohol groups, carboxylic groups, aldehyde groups, ketone groups, etc., for example as commonly found in natural biomass materials. Examples of suitable biomass materials including one or more phenolic functional groups include lignin and biomass extractives, for example including tannins.

In a refinement, the UV stabilizing material comprises lignin. Plants, in general, are comprised of cellulose, hemicellulose, lignin, extractives, and ash. Lignin typically constitutes 15-35 wt. % of woody plant cell walls, is an amorphous aromatic polymer made of phenylpropane units (e.g., coniferyl alcohol, sinapyl alcohol, p-coumaryl alcohol). The lignin for use according to the disclosure is not particularly limited to the source of lignin or its isolation method. Any type of lignin regardless of the biomass type (hardwood, softwood and grasses) isolated through any extraction methods (such as Kraft, soda, organosolv, enzymatic liquid and Ionic liquid) is suitable for use in the disclosed compositions and articles.

In a refinement, the UV stabilizing material comprises an organic UV stabilizer. In a further refinement, the organic UV stabilizer is selected from organic UV absorbers, hindered amine light stabilizers, and combinations thereof. Suitable organic UV absorbers (UVA) can include benzophenones (e.g., 2-hydroxybenzophenones (BP)), oxalanilides (OX), benzotriazoles (e.g., 2-(2-hydroxyphenyl)-benzotriazoles (BTZ)), and triazines (e.g., 2-hydroxyphenyl-s-triazines (HPT)). The organic UV absorbers can have absorption peaks at one or more wavelengths in the UV range from 200-400 nm, for example one or more of 300 nm, 340 nm, and 350 nm for common organic UV absorbers. Suitable hindered amine light stabilizers including a hindered amine functional group, for example including compounds with one or more 2,2,6,6-tetramethylpiperidine groups.

In a refinement, the UV stabilizing material is present in an amount in a range of 1 wt. % to 20 wt. % or 8 wt. % to 16 wt. % relative to the nanoparticles (e.g., the combined weight of the clay nanotube encapsulating bodies and the UV stabilizing materials). For example, the UV stabilizing material can have a loading level of at least 1, 2, 4, 6, 8, or 10 wt. % and/or up to 8, 10, 12, 14, 16, or 20 wt. %. The UV stabilizing material is generally present/contained within the cylindrical body and corresponding interior volume of the nanotubes, although some UV stabilizing material can be adsorbed or otherwise adhered to outer surfaces of the nanotubes. The foregoing ranges can apply collectively or individually to all UV stabilizing materials, when more than one type is encapsulated in the nanoparticles.

In another aspect, the disclosure relates to a polymer composite comprising: a polymer matrix (e.g., epoxy or other thermoset, a thermoplastic, a polymer blend, etc.); and encapsulated UV stabilizer nanoparticles according to any of the disclosed embodiments and refinements distributed throughout the polymer matrix. The polymer matrix is generally a continuous phase in the composite, while the nanoparticles form a heterogeneous, discontinuous phase of the composite. The nanoparticles can be even distributed throughout the polymer matrix as discrete heterogeneous particles. The polymer matrix and/or the corresponding polymer composite can be in any suitable form, for example a film or coating on a substrate (e.g., as described below), a biocomposite, or a stand-alone material such as an engineering plastic (e.g., rigid or other structural plastic material), an adhesive material, a (polymeric) foam material, or an elastomer.

Various refinements of the polymer composite are possible.

In a refinement, the polymer matrix comprises a thermoset material. Examples of suitable thermoset materials include various crosslinked or networked polymers such as epoxy resins, acrylic resins, polyester resins, polyurea resins, polyurethane resins, phenol-formaldehyde resins, urea-formaldehyde, melamine resins, polyimide resins, silicone resins, vinyl ester resins, and combinations thereof (e.g., mixtures thereof and/or copolymers or respective monomers thereof). In a particular refinement, the thermoset material comprises an epoxy thermoset (e.g., formed between an epoxide-functional prepolymer and a hardener monomer such as a (polyfunctional) amine, anhydride, and/or thiol).

In a refinement, the polymer matrix comprises a thermoplastic material. Examples of suitable thermoplastic materials include polyethylene (PE), polypropylene (PP), other polyolefins, polylactic acid (PLA), polyvinyl alcohol (PVOH), ethylene vinyl alcohol (EVOH), polyethylene terephthalate (PET), acrylic thermoplastics (e.g., poly(methyl methacrylate) (PMMA)), polyamide (nylons), polycarbonate (PC), polystyrene (PS), polyvinyl chloride (PVC), and combinations thereof (e.g., mixtures thereof and/or copolymers or respective monomers thereof).

The polymer composite optionally can include any suitable organic or inorganic filler or additive, which can be included to improve one or more of mechanical properties, optical properties, and electrical properties of the final composition. Examples of suitable fillers or additives include (non-nanotubular) nanoclays (e.g., generally platelets or other shape that do not encapsulate UV materials), graphene oxide, graphene, zinc oxide, iron oxide, calcium carbonate, aluminum oxide, chlorine, bromine, silicon dioxide (silica), aluminum oxide, diatomaceous earth, cellulose nanocrystals, carbon nanotubes, titanium dioxide (titania), and combinations or mixtures thereof. In addition, the fillers can include biocides, pigments, dyes, a thermoplastic material, or a combination thereof. The fillers or additives can be added in the range from 0.01 wt. % to 10 wt. %, for example in range from 0.1 wt. % to 6 wt. %. or 1 wt. % to 5 wt. %.

In a refinement, the encapsulated UV stabilizer nanoparticles are present in an amount in a range of 0.1 wt. % to 10 wt. % or 0.5 wt. % to 4 wt. % relative to the polymer composite (e.g., the combined weight of the encapsulated UV stabilizer nanoparticles, the polymer matrix, and any optional filler or additive materials). For example, the encapsulated UV stabilizer nanoparticles can have a loading level of at least 0.1, 0.2, 0.3, 0.5, 0.7, 1, 1.2, 1.5, 2, 4, or 6 wt. % and/or up to 1, 1.2, 1.5, 2, 2.5, 3, 4, 6, 8, or 10 wt. %. The encapsulated UV stabilizer nanoparticles are generally distributed throughout the polymer matrix as a heterogeneous, discontinuous phase such as is common for a composite reinforcement material.

In another aspect, the disclosure relates to a coated article comprising: a substrate; and a polymer composite according to any of the disclosed embodiments and refinements coated on a surface of the substrate. The substrate, the polymer composite, or both can be an adhesive, a foam, or an elastomer. The polymer composite can be in the form of a coating or film on an external, environment-facing surface of the substrate (e.g., where the surface would otherwise be exposed to the external environment in the absence of the polymer composite coating). In this case, the polymer composite coating provides UV protection to the underlying substrate, for example when exposed to sunlight or other sources of UV radiation.

Various refinements of the coated article are possible.

The substrate is not particularly limited, and generally can be formed from any material desired for UV protection with the polymer composite. For example, the substrate can be a metal, plastic (e.g., thermoset or thermoplastic, which can be the same or different from the polymer matrix), a primer material, glass, wood, biocomposite, fabric (or textile), or ceramic material. Examples of specific metals include steel, aluminum, copper, etc. Examples of specific plastics include the various thermosets and thermoplastics mentioned above for the polymer matrix, starch, chitosan, etc. Suitable wood materials can be any type of wood commonly used in indoor and outdoor settings. Suitable glass materials can be those used for building windows, automobile windows, etc. In some embodiments, the substrate is a top layer of a coating or series of coatings on a different underlying substrate. For example, the coated article can include a substrate material as generally disclosed herein, one or more intermediate coatings on the substrate (e.g., an epoxy coating, an acrylic coating, a primer coating, etc.), and the polymer composite coating on the one or more intermediate coatings as the final, external coating on the coated article.

In a refinement, the polymer composite has a thickness ranging from 10 µm to 3500 µm (e.g., at least 10, 20, 50, 100, 200, 300, 500, or 1000 µm and/or up to 50, 100, 200, 300, 500, 1000, 2000, or 3500 µm). Typical cast coatings can have thicknesses of 10 µm to 100 µm. Multiple coating layers of the polymer composite can be applied to the substrate to form even thicker layers of the polymer composite if desired.

While the disclosed compositions, compounds, methods, and articles are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

BRIEF DESCRIPTION OF THE DRAWINGS

For a more complete understanding of the disclosure, reference should be made to the following detailed description and accompanying drawings wherein:

FIG. 4A is an FE-SEM micrograph of a sample containing an HNT-epoxy nanocomposite with 1 wt % pristine HNT (no encapsulation) before UV irradiation (scale bar: 100 μm).

FIG. 4B is an FE-SEM micrograph of a sample containing an HNT-epoxy nanocomposite with 1 wt % pristine HNT (no encapsulation) after 35 days of UV irradiation (scale bar: 100 μm).

FIG. 4C is an FE-SEM micrograph of a sample containing an HNT-epoxy nanocomposite with 2 wt % pristine HNT (no encapsulation) before UV irradiation (scale bar: 100 μm).

FIG. 4D is an FE-SEM micrograph of a sample containing an HNT-epoxy nanocomposite with 2 wt % pristine HNT (no encapsulation) after 35 days of UV irradiation (scale bar: 100 μm).

FIG. 4E is an FE-SEM micrograph of a sample containing an HNT-epoxy nanocomposite with 3 wt % pristine HNT (no encapsulation) before UV irradiation (scale bar: 100 μm).

FIG. 4F is an FE-SEM micrograph of a sample containing an HNT-epoxy nanocomposite with 3 wt % pristine HNT (no encapsulation) after 35 days of UV irradiation (scale bar: 100 μm).

DETAILED DESCRIPTION

Photodegradation under UV exposure is a common failure mechanism of coatings, such as organic coatings. Coatings are commonly formulated with transparent UV stabilizers to minimize such failures. A suitable UV stabilizer should have two properties: (1) lack of color, and (2) ability to inhibit UV light from reaching the polymeric chains by, for example, dispersing the UV light or transforming the UV light into less harmful energy before reaching the substrate. UV stabilizers can generally be divided into two main categories: organic and inorganic stabilizers. Organic stabilizers can further be classified into UV absorbers and hindered amine light stabilizers (HALS).

UV absorbers can filter out the harmful wavelengths of light before they reach the polymer chains, and therefore decrease the radical concentration and rate of radical formation. UV absorbers that are known include 2-hydroxybenzophenones (BP) and oxalanilides (OX), and 2-(2-hydroxyphenyl)-benzotriazoles (BTZ), the latter of which can be used in transparent coatings. BTZ has two absorption peaks in the UV area at 300 nm and 350 nm. Primary photophysical properties, like absorbance profile, intensity of absorbance and extinction, and photochemical stability, are main requirements for a UV absorber. The performance of the UV absorber can be impacted, however, when the concentration of the UV absorber is decreased due to, for example, high vapor pressure, leaching, migration, etc., as well as by chemical loss due to photochemical reactions of the absorbers.

HALS are generally the main UV stabilizers added to clear and transparent coatings. These stabilizers interact with radicals and decrease the photooxidative degradation of polymers. HALS are commonly derivatives of 2,2,6,6-tetramethylpiperidine.

Inorganic UV stabilizers are typically based on metal oxide films or particles which are applied to scatter or absorb light. Nanosized metal oxides like ZnO and $TiO_2$ are used to absorb UV radiation. Because of the small size, inorganic stabilizers are able to give UV protection to coatings and substrates while maintaining transparency.

Additionally, lignin is the most abundant natural aromatic polymer in the world, and constitutes 15-35 wt % of the wood and other plant biomass. Lignin is a natural UV absorber with excellent radical scavenging and antimicrobial properties. However, difficulty in the synthesis and homogeneous dispersion of lignin nanoparticles into coatings has limited its application at the industrial level.

Figure 10:
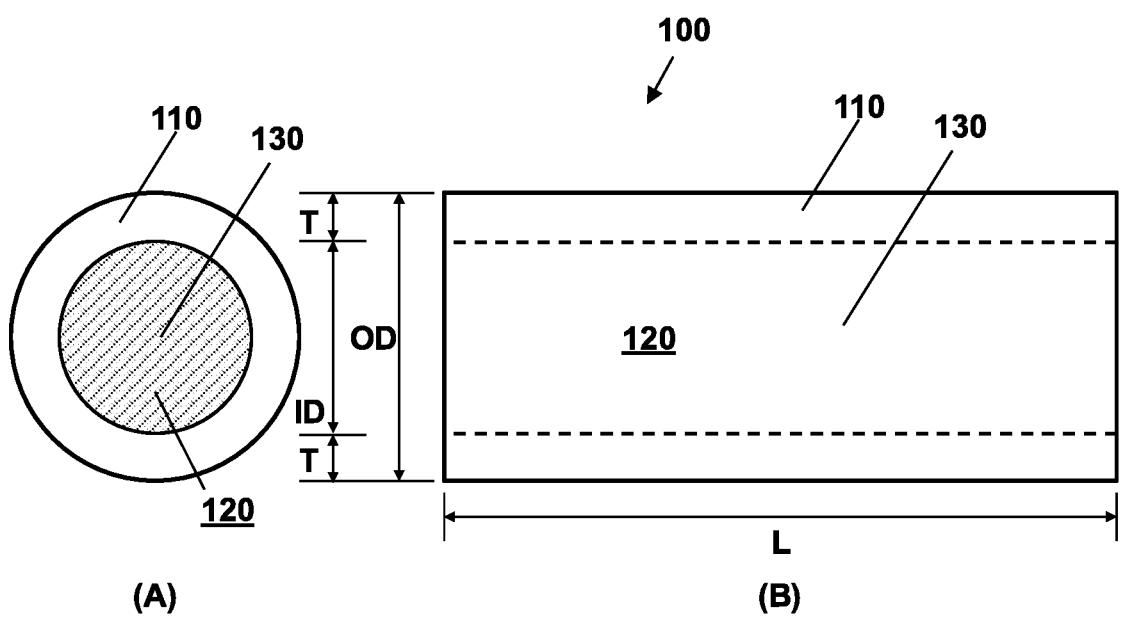
FIG. 10 is a schematic of an encapsulated UV stabilizer nanoparticle according to the disclosure, including an end view (A) and a side view (B).
Figure 11:
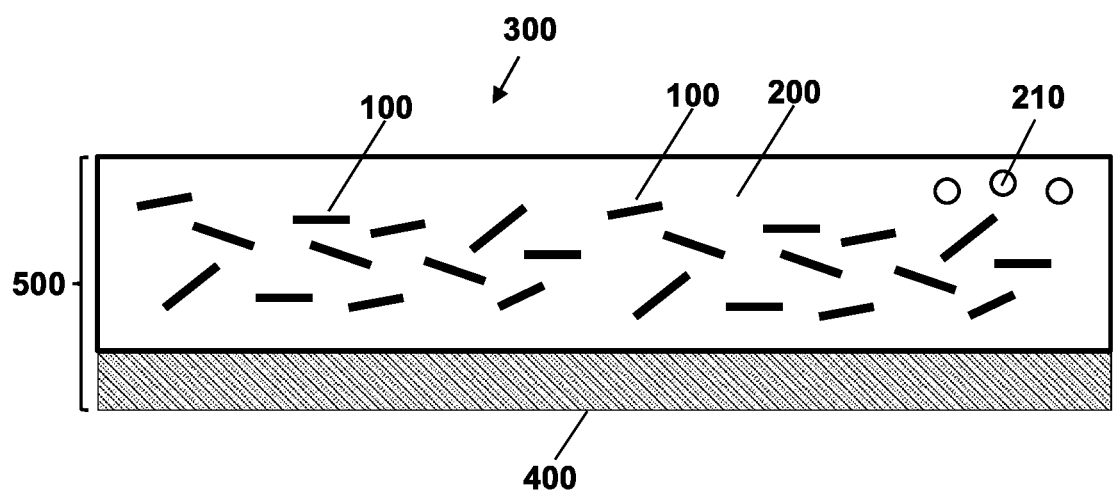
FIG. 11 is a schematic of a polymer composite and corresponding coated article nanoparticle according to the disclosure.

As illustrated in FIG. 10, the disclosure relates to encapsulated UV (ultraviolet) stabilizer nanoparticles 100, which nanoparticles limit or prevent the migration of UV stabilizers to the surface of a coating in service and/or which otherwise preserve the UV-resistance properties of the UV stabilizer for a longer period once incorporated into a UV-protective coating. The nanoparticles 100 each include a clay or other nanotube encapsulating body 110 such as a halloysite nanotube (HNT) and a UV stabilizing material 130 within the interior cylindrical volume 120 of the nanotube encapsulating body 110. The UV stabilizing material 130 can include one or more of lignin, an organic UV stabilizer, and an inorganic UV stabilizer. As illustrated in FIG. 11, the encapsulated UV stabilizer nanoparticles 100 can be incorporated into a polymer composite 300 as a heterogeneous phase distributed throughout a continuous polymer matrix 200. The polymer composite 300 can be applied as a coating or a film to an underlying substrate 400 to form a corresponding coated article 500. The particular type of coating is not particularly limited and can include any protective and/or decorative coating layer such as a stain, a varnish, a lacquer, a primer, or a paint. Accordingly, the coating can further include a filler or additive 210 such as a pigment, dye, or other colorant, for example when the coating is a paint or other colored coating.

In an illustrative embodiment, halloysite nanotubes (HNT) are used as a carrier to encapsulate lignin and/or organic UV stabilizers as additives for polymeric resin applications like coatings, adhesives, biocomposites, foams, films and elastomers. In this way, the UV stability performance of the organic UV stabilizers is increased significantly by reducing migration of the stabilizer to the surface. Lignin also can be used as a green, sustainable raw material in nano-size as an excellent UV-absorber. When compared with commercial organic UV stabilizers, the performance of HNT-encapsulated organic UV stabilizers and lignin in HNTs shows that encapsulation in HNTs enhances the UV resistance performance of a coating significantly. Further, HNT encapsulated with lignin has substantially improved performance compared to other systems, even including organic UV stabilizers encapsulated in HNT. The use of HNT for encapsulation of UV stabilizers (e.g., organic UV stabilizers and/or lignin) provides excellent UV stability for a polymer matrix into which the HNT-encapsulated UV stabilizers are incorporated. By using HNT, not only the thermal, mechanical and chemical properties of the polymer composite are increased, but also a lower amount of stabilizers needed to achieve the same or better level of performance.

Encapsulated UV Stabilizer Nanoparticles
Clay Nanotube Encapsulating Body

According to the disclosure, each of the encapsulated UV stabilizer nanoparticles 100 described herein include a nanotube encapsulating body 110, for example a clay nanotube encapsulating body.

Each of the nanotube encapsulating bodies can be selected from a variety of materials. Specifically, the nanotubular geometry of the encapsulating body can allow the encapsulating bodies to absorb, contain (e.g., within their cylindrical interior), stabilize, and deliver UV stabilizing materials to, for example, an organic or inorganic coating. Non-limiting examples of such nanotube materials include halloysite nanotubes, carbon nanotubes (e.g., single-walled, multi-walled), silicon nanotubes, boron-carbon-nitride nanotubes, boron-nitride nanotubes, and combinations or mixtures thereof. In particular, halloysite nanotubes are natural, clay-based nanotube materials that are geometrically suitable, chemically compatible with a variety of UV stabilizing materials and polymer matrix materials, and relatively inexpensive. In embodiments, the nanotube encapsulating bodies include a nanotube material selected from halloysite nanotubes, carbon nanotubes, silicon nanotubes, boron-carbon-nitride nanotubes, boron-nitride nanotubes, and combinations or mixtures thereof. In embodiments, the nanotube encapsulating bodies include a halloysite nanotube. In embodiments, the nanotube encapsulating bodies include a synthetic nanotube material, such as carbon nanotubes, or otherwise have suitable geometric parameters and chemical compatibility.

Clay materials suitable for use as the encapsulating body generally include hydrous aluminum phyllosilicates having a nanotube structure. Non-limiting examples of clay materials can include halloysite, kaolinite, illite, montmorillonite, vermiculite, talc, sepiolite, palygorskite (or attapulgite), and pyrophyllite. In embodiments, the clay material includes halloysite. As described herein, halloysite is an aluminosilicate clay mineral with the empirical formula $Al_2Si_2O_5(OH)_4 \cdot 2H_2O$, and it can occur intermixed with dickite, kaolinite, montmorillonite and other clay minerals. Generally, halloysite can be in the form as small cylinders (nanotubes) in which the outer surface is mostly composed of $SiO_2$ and the inner surface primarily of $Al_2O_3$. Halloysite is commonly found with kaolinite, both are which are hydrated aluminosilicate minerals. Halloysite ($Al_2Si_2O_5(OH)_4 \cdot 2H_2O$) and kaolinite ($Al_2Si_2O_5(OH)_4$) have the same hydrated aluminosilicate formula, but halloysite has non-structural water intercalated between the aluminosilicate layers, which can cause the halloysite platelet to assume a tubular form (a "halloysite nanotube" or "HNT"), which is a natural nanotube. In contrast, kaolinite tends to remain in a planar form. In embodiments, the majority of clay materials in the encapsulated UV stabilizer composition is in the form of the nanotubular shape formed from HNT.

In embodiments, the amount of the clay materials (i.e., in the clay nanotube encapsulating body) that are in the form of clay nanotubes is from about 70 wt % to about 100 wt %, based on the total weight of the clay materials, for example at least about 70, 80, 90, or 95 wt. % and/or up to about 80, 90, 95, 98, 99, or 100 wt. % of the clay materials are in the form of clay nanotubes. In embodiments, the amount of the clay materials that are in the form of clay nanotubes is from about 70 wt % to about 99 wt %, about 70 wt % to about 95 wt %, or about 70 wt % to about 80 wt %. In embodiments, a clay material used to form the encapsulated UV stabilizer nanoparticles includes about 70 wt. % halloysite nanotubes and about 30 wt. % kaolinite or other non-nanotubular clay material.

As provided herein, the encapsulating body 110 can include a cylindrical body defining an interior cylindrical volume 120. The nanotube materials generally have a nanometer-scale diameter, a nanometer- or micron-scale length, and a large aspect ratio (e.g., at least 5 and/or up to 1000).

In embodiments, the encapsulating body 110 has an internal diameter (ID) in a range from about 10 nm to about 100 nm. As used herein, the internal diameter refers to the diameter defining the interior cylindrical volume 120 of the nanotube encapsulating body 110. For example, the internal diameter of the encapsulating body can range from at least about 10, 12, 15, 20, 25, 30, 40, or 50 nm and/or up to about 50, 60, 70, 80, 90, or 100 nm. In embodiments, the internal diameter is in a range from about 10 nm to about 90 nm, about 12 nm to about 80 nm, about 20 nm to about 70 nm, or about 30 nm to about 50 nm. In embodiments, the internal diameter is in a range of about 15 nm to about 70 nm.

In embodiments, the encapsulating body 110 has an outer diameter (OD) in a range from about 40 nm to about 400 nm. As used herein, the outer diameter refers to the total diameter of the nanotube encapsulating body (i.e., including the internal diameter and 2× the wall thickness). For example, the outer diameter of the encapsulating body can range from at least about 40, 50, 60, 80, 100, 150, or 200 nm and/or up to 50, 60, 80, 100, 150, 200, 250, 300, or 400 nm. In embodiments, the outer diameter is in a range from about 40 nm to about 300 nm, about 50 nm to about 250 nm, about 80 nm to about 200 nm, or about 100 nm to about 150 nm. In embodiments, the outer diameter is in a range of about 50 nm to about 200 nm.

In embodiments, the encapsulating body 110 has a wall thickness (T) in a range from at least about 5 nm to about 150 nm. As used herein, the wall thickness refers to half the difference between the inner diameter and the outer diameter. For example, the wall thickness can range from at least about 5, 7, 10, 12, 15, 20, or 25 nm and/or up to about 20, 25, 30, 40, 60, 80, 100, 120, or 150 nm. In embodiments, the wall thickness is in a range from about 10 nm to about 150 nm, about 15 nm to about 100 nm, about 20 nm to about 80 nm, or about 5 nm to about 20 nm.

In embodiments, the encapsulating body 110 has a length (L) in a range from about 0.1 μm to about 10 μm. For example, the length can be at least about 0.1, 0.2, 0.5, 1, 1.2, 1.5, 2, or 4 μm and/or up to about 1, 2, 4, 6, 8, or 10 μm. In embodiments, the length is in a range of about 0.1 μm to about 8 µm, about 0.1 µm to about 6 µm, about 0.1 µm to about 4 µm, or about 0.1 µm to about 2 µm. In embodiments, the length is in a range of about 0.1 µm to about 3 µm.

In embodiments, the aspect ratio (i.e., the length divided by the outer diameter) is in a range of about 5 to about 1000. For example, the aspect ratio can be in a range of at least about 5, 10, 20, 40, 60, 80, or 100 and/or up to about 20, 50, 100, 200, 500, or 1000. In embodiments, the aspect ratio is in a range of about 5 to about 500, about 10 to about 200, about 40 to about 100, about 40 to about 60, or about 10 to about 50. In embodiments, the aspect ratio is about 12.

All of the foregoing ranges for the various geometrical aspects of the encapsulating body (e.g., internal diameter, outer diameter, wall thickness, length, aspect ratio, etc.) can represent a distribution property of the nanoparticles, for example a size range within which at least 90, 95, 98, or 99% of the nanoparticles fall, for example on a number, weight, or volume basis. Similarly, a number-, weight-, or volume-average size (e.g., length, diameter, etc.) of a given nanoparticle can be within any of the foregoing ranges.

UV Stabilizing Material

The encapsulated UV stabilizer nanoparticles 100 of the disclosure include a UV stabilizing material 130 within the interior cylindrical volume 120 of the encapsulating body 110. The UV stabilizing material 130 includes at least one of a biomass material including a phenolic functional group (e.g., a lignin) and an organic UV stabilizer.

In embodiments, the UV stabilizing material includes a biomass material having a phenolic functional group. As described herein, a phenolic group includes an aromatic $C_6$ (benzene) ring substituted with at least one phenolic —OH (hydroxy) group. Phenolic groups can have single or multiple phenolic —OH (hydroxy) groups, for example including mono-, di-, or tri-hydroxy-substituted aromatic $C_6$ rings. The aromatic rings can include other functional groups, for example linking together multiple aromatic rings with phenolic groups together, such as in a polyphenolic compound. Non-limiting examples of other suitable functional groups or linking groups can include alkoxy groups, ether groups, alcohol groups, carboxylic groups, aldehyde groups, ketone groups, etc., for example as commonly found in natural biomass materials. Examples of suitable biomass materials including one or more phenolic functional groups include lignin and biomass extractives, for example including tannins.

In embodiments, the UV stabilizing material includes lignin. Plants, in general, are comprised of cellulose, hemicellulose, lignin, extractives, and ash. Lignin typically constitutes 15-35 wt. % of woody plant cell walls, is an amorphous aromatic polymer made of phenylpropane units (e.g., coniferyl alcohol, sinapyl alcohol, p-coumaryl alcohol). The lignin for use according to the disclosure is not particularly limited to the source of lignin or its isolation method. Any type of lignin regardless of the biomass type (hardwood, softwood and grasses) isolated through any extraction methods (such as Kraft, soda, organosolv, enzymatic liquid and Ionic liquid) is suitable for use in the disclosed compositions and articles. In embodiments, the UV stabilizing material includes hardwood organosolv lignin.

In embodiments, the UV stabilizing material includes a biomass extractive, such as a tannin.

In embodiments, the UV stabilizing material includes an organic UV stabilizer. As described herein, organic stabilizers can be classified into UV absorbers and hindered amine light stabilizers (HALS). Non-limiting examples of suitable organic UV absorbers (UVA) include benzophenones (e.g., 2-hydroxybenzophenones (BP)), oxalanilides (OX), benzotriazoles (e.g., 2-(2-hydroxyphenyl)-benzotriazoles (BTZ)), and triazines (e.g., 2-hydroxyphenyl-s-triazines (HPT)). The organic UV absorbers can have absorption peaks at one or more wavelengths in the UV range from 200-400 nm, for example one or more of 300 nm, 340 nm, and 350 nm for common organic UV absorbers. Non-limiting examples of suitable hindered amine light stabilizers are any compounds having one or more 2,2,6,6-tetramethylpiperidine groups.

In embodiments, the organic UV stabilizer includes organic UV absorbers, HALS, or a combination thereof. In embodiments, the UV stabilizing material includes a hydroxyphenyl benzotraizole (e.g., commercially available as TINUVIN 1130). In embodiments, the UV stabilizing material includes a hindered amine light stabilizer (e.g., commercially available as TINUVIN 292). In embodiments, the UV stabilizing material includes a combination of an organic UV absorber (e.g., TINUVIN 1130) and a HALS (e.g., TINUVIN 292).

The UV stabilizing material can be present in an amount in a range of about 1 wt. % to about 20 wt. %, relative to the nanoparticles (e.g., the combined weight of the clay nanotube encapsulating bodies and the UV stabilizing materials). For example, the UV stabilizing material can have a loading level of at least about 1, 2, 4, 6, 8, or 10 wt. % and/or up to about 8, 10, 12, 14, 16, or 20 wt. %. In embodiments, the UV stabilizing material is present in an amount in a range of about 1 wt % to about 16 wt %, about 2 wt % to about 10 wt %, or about 8 wt % to about 20 wt %. In embodiments, the UV stabilizing material is present in an amount in a range of about 8 wt. % to 16 wt. %. The UV stabilizing material can generally be present/contained within the cylindrical body and corresponding interior volume of the nanotubes, although some UV stabilizing material can be adsorbed or otherwise adhered to outer surfaces of the nanotubes.

All of the foregoing ranges can apply collectively or individually to all UV stabilizing materials, when more than one type is encapsulated in the nanoparticles.

Polymer Composite

Further provided herein are polymer composites 300. The polymer composites 300 can include the encapsulated UV stabilizer nanoparticles 100, as described herein, and a polymer matrix 200. The encapsulated UV stabilizer nanoparticles 100 can be distributed throughout the polymer matrix 200. The encapsulated UV stabilizer nanoparticles 100 are generally distributed throughout the polymer matrix 200 as a heterogeneous, discontinuous phase such as is common for a composite reinforcement material.

In embodiments, the polymer matrix includes a thermoset material. Non-limiting examples of suitable thermoset materials include various crosslinked or networked polymers such as epoxy resins, acrylic resins, polyester resins, polyurea resins, polyurethane resins, phenol-formaldehyde resins, urea-formaldehyde, melamine resins, polyimide resins, silicone resins, vinyl ester resins, and combinations thereof (e.g., mixtures thereof and/or copolymers or respective monomers thereof). In embodiments, the thermoset material includes an epoxy thermoset. For example, the thermoset material can include an epoxy thermoset formed between an epoxide-functional prepolymer and a hardener monomer such as a (polyfunctional) amine, anhydride, and/or thiol.

In embodiments, the polymer matrix includes a thermoplastic polymer. Non-limiting examples of suitable thermoplastic polymers include polyethylene (PE), polypropylene (PP), other polyolefins, polylactic acid (PLA), polyvinyl alcohol (PVOH), ethylene vinyl alcohol (EVOH), polyethylene terephthalate (PET), acrylic thermoplastics (e.g., poly (methyl methacrylate) (PMMA)), polyamide (nylons), polycarbonate (PC), polystyrene (PS), polyvinyl chloride (PVC), and combinations thereof (e.g., mixtures thereof and/or copolymers or respective monomers thereof).

The polymer composite can further include one or more inorganic or organic additives or fillers 210. Non-limiting examples of suitable additives include (non-nanotubular) nanoclay, graphene oxide, graphene, silicon dioxide (silica), aluminum oxide, cellulose nanocrystals, carbon nanotubes, titanium dioxide (titania), diatomaceous earth, biocides, pigments, dyes, thermoplastics, and combinations thereof. Non-limiting examples of suitable fillers include biocides, pigments, dyes, a thermoplastic material, or a combination thereof. The one or more additives and/or fillers can be included to improve one or more of mechanical properties, optical properties, and electrical properties of the final composition. In embodiments, the fillers and/or additives can be included in a range from about 0.01 wt. % to about 10 wt. %, for example at least about 0.01, 0.05, 0.1, 0.5, 1, 2, or 3 wt. %, and/or up to about 1, 2, 3, 4, 5, 6, 7, 8, 9, or 10 wt. %. In embodiments, the fillers and/or additives are included in an amount ranging from about 0.1 wt. % to about 6 wt. %, or about 1 wt. % to about 5 wt. %. The additives or fillers 210 are schematically represented as discrete particles heterogeneously distributed throughout the polymer matrix 200 in FIG. 11, which can be the case for particulate additives or fillers 210 such as silica, titania, pigments, etc. Alternatively, the additives or fillers 210 can be homogeneously distributed throughout the polymer matrix 200, for example being a solid solution with the polymer matrix 200 material (e.g., a dye mixed with the polymer material before forming a solid matrix).

The encapsulated UV stabilizer nanoparticles can be present in an amount in a range of about 0.1 wt. % to about 10 wt. %, relative to the polymer composite (e.g., the combined weight of the encapsulated UV stabilizer nanoparticles, the polymer matrix, and any optional filler or additive materials). For example, the encapsulated UV stabilizer nanoparticles can have a loading level of at least about 0.1, 0.2, 0.3, 0.5, 0.7, 1, 1.2, 1.5, 2, 4, or 6 wt. % and/or up to about 1, 1.2, 1.5, 2, 2.5, 3, 4, 6, 8, or 10 wt. %. In embodiments, the encapsulated UV stabilizer nanoparticles are present in an amount in a range of about 0.5 wt. % to about 4 wt. %, relative to the polymer composite.

Coated Articles

Further provided herein are coated articles 500 including the polymer composite 300 described herein and a substrate 400. The polymer composite 300 can be coated on a surface of the substrate 400.

The substrate can generally be formed from any material desired for UV protection with the polymer composite. For example, the substrate can be a metal, plastic (e.g., thermoset or thermoplastic, which can be the same or different from the polymer matrix), a primer material, glass, wood, a biocomposite, a fabric (or textile), or a ceramic material. Nonlimiting examples of specific metals that can be used as the substrate include steel, aluminum, copper, etc. Nonlimiting examples of specific plastics include the various thermosets and thermoplastics mentioned above for the polymer matrix, starch, chitosan, etc. Nonlimiting examples of suitable wood materials can be any type of wood commonly used in indoor and outdoor settings. Nonlimiting examples of suitable glass materials can be those used for building windows, automobile windows, etc. In embodiments, the substrate is a top layer of a coating or series of coatings on a different underlying substrate. For example, in embodiments, the coated article includes a substrate material as generally disclosed herein, one or more intermediate coatings on the substrate (e.g., an epoxy coating, an acrylic coating, a primer coating, etc.), and the polymer composite coating on the one or more intermediate coatings as the final, external coating on the coated article.

In embodiments, the substrate includes metal, plastics, glass, wood, fabric (or textile), and ceramics.

The polymer composite (e.g., as applied to a surface of the substrate) can have a thickness ranging from about 10 μm to about 3500 μm, for example at least about 10, 20, 50, 100, 200, 300, 500, or 1000 μm and/or up to about 50, 100, 200, 300, 500, 1000, 2000, or 3500 μm. In embodiments, the polymer composite has a thickness of about 10 μm to 100 μm. In embodiments, the polymer composite has a thickness of about 10 μm to 1000 μm. In embodiments, multiple coating layers of the polymer composite are applied to the substrate to form even thicker layers of the polymer composite.

It is to be understood that while the disclosure is read in conjunction with the detailed description thereof, the foregoing description and following examples are intended to illustrate and not limit the scope of the disclosure, which is defined by the scope of the appended claims. Other aspects, advantages, and modifications are within the scope of the following claims.

EXAMPLES

Example 1

Preparation and Analysis of HNT-Epoxy Nanocomposites Materials

Halloysite nanotubes (HALLOPURE) were supplied from I-MINERALSINC. Liquid diglycidyl ether of bisphenol A (EPON Resin 828) with epoxy equivalent weight of 185-192 g/eq was supplied by E.V. Roberts. Isophorone diamine (IPDA) and acetone were purchased from Fisher Scientific Co. TINUVIN 1130 and TINUVIN 292 were provided from Sherwin-Williams. Hardwood organosolv lignin was supplied from Lignol (Vancouver).

Loading of Organic UV Stabilizers and Lignin into HNT

A 392 mg/mL solution of TINUVIN 1130/TINUVIN 292 (1:1) ("UVA/HALS blend") or hardwood organosolv lignin ("lignin") was prepared in acetone. Acetone was selected as a non-VOC solvent for its low surface tension, which can easily solubilize organosolv lignin. Then, 0.6 g HNT was added to the solution and mixed for 48 hours at room temperature. The suspension was transferred to a vacuum jar for 5 minutes at 11 psi (76 kPa). This process was repeated three times, or until there were no air bubbles coming from the surface of the solution, to increase loading efficiency. The lack of air bubbles indicated that all the air was removed from inside the nanotube and that the gaps were filled with a solution of the UVA/HALS blend or lignin. Finally, HNTs were separated from solution by centrifuge (5000 rpm for 5 min) and washed three times with acetone, and once with DI water.

Preparation of HNT-Epoxy nanocomposites

To prepare samples containing HNT, a specific amount of HNT (i.e., 1 wt %, 2 wt %, or 3 wt %) was added to the epoxy resin and 10 wt % benzyl alcohol, based on the weight of the epoxy resin, was added to decrease the viscosity. The samples were placed in a sonication probe with 50% amplitude for 5 minutes, followed by 30 minutes in an ultrasonication bath at room temperature. Then, a curing agent (0.22 g IPDA to 1 g epoxy resin) was added and was mechanically mixed for 1 minute, followed by 2 minutes in the ultrasonic probe. For control samples without HNT, the specific amount of epoxy resin, curing agent, benzyl alcohol and additive (i.e., UVA/HALS blend or lignin) was mixed with a mechanical mixer for 2 minutes at 500 rpm. Then, the mixture was poured into an aluminum pan (10 cm diameter and 0.5 cm height) and put into the oven at 60° C. for 2 hours. All samples were kept in a dark place for 7 days at room temperature before any analysis to reach maximum crosslink density and prevent potential unwanted reactions of photoactive compounds in the epoxy system.

Twelve different samples were prepared according to Table 1, below.

TABLE 1

Composition of Prepared Samples

| Sample ID | Type of Additive | Amount of Additive (wt %) |
|---|---|---|
| E | — | — |
| T | UVA/HALS blend | 2 |
| L | Lignin | 2 |
| HNT-T1 | UVA/HALS blend | 1 |
| HNT-T2 | | 2 |
| HNT-T3 | | 3 |
| HNT-L1 | Lignin | 1 |
| HNT-L2 | | 2 |
| HNT-L3 | | 3 |
| HNT-P1 | Pristine HNT | 1 |
| HNT-P2 | | 2 |
| HNT-P3 | | 3 |

Weathering Test

Photostability of the coating samples were evaluated by exposing them to an accelerated weathering test using a QUV accelerated weathering machine (source: UVA 340 nm) at an irradiance of 0.68 W/m$^2$ and a chamber temperature of 60° C. UV irradiation was applied without any condensation of water spray cycle. The test was continued for 35 days (840 h). Samples were evaluated before exposure, and then every week during and after 35 days of exposure. The UV light was similar to the UV light that reaches the earth's surface by sunlight.

Figure 1A:
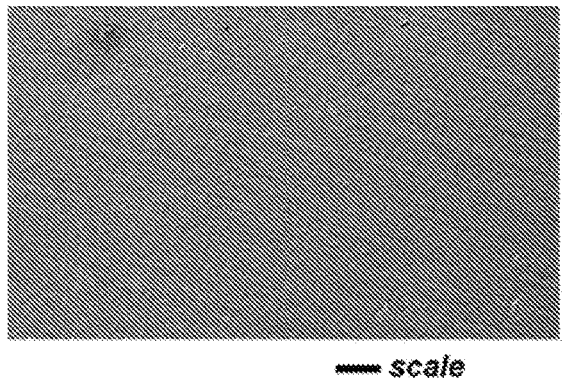
FIG. 1A is an FE-SEM micrograph of a sample containing epoxy only before UV irradiation (scale bar: 100 µm).
Figure 1B:
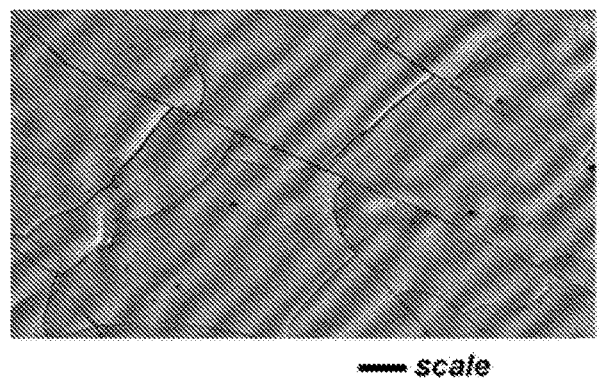
FIG. 1B is an FE-SEM micrograph of a sample containing epoxy only after 35 days of UV irradiation (scale bar: 100 µm).
Figure 1C:
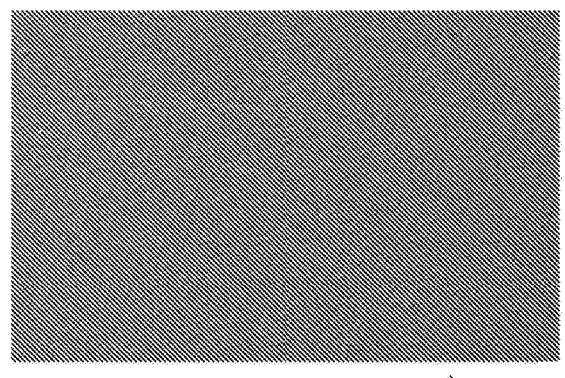
FIG. 1C is an FE-SEM micrograph of a sample containing epoxy and a UVA/HALS blend before UV irradiation (scale bar: 100 µm).
Figure 1D:
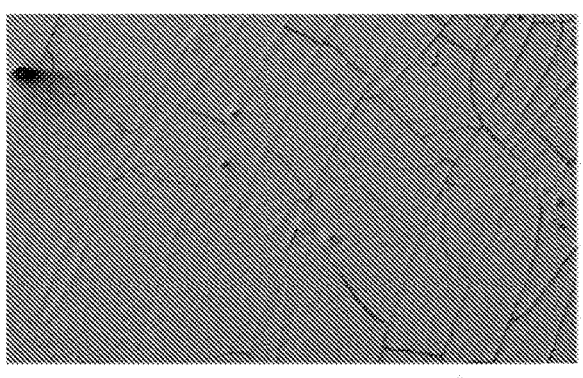
FIG. 1D is an FE-SEM micrograph of a sample containing epoxy and a UVA/HALS blend after 35 days of UV irradiation (scale bar: 100 µm).
Figure 1E:
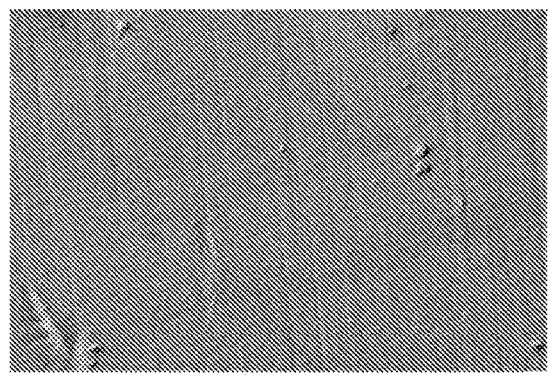
FIG. 1E is an FE-SEM micrograph of a sample containing epoxy and lignin before UV irradiation (scale bar: 100 µm).
Figure 1F:
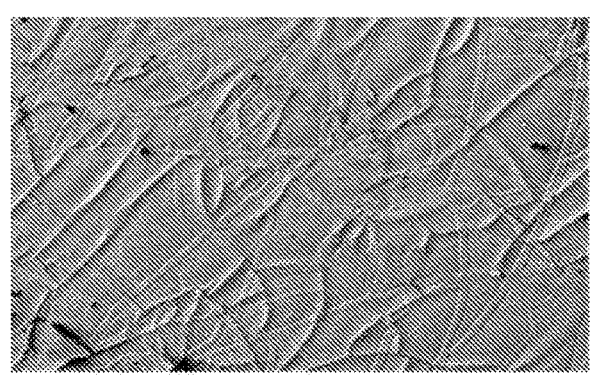
FIG. 1F is an FE-SEM micrograph of a sample containing epoxy and lignin after 35 days of UV irradiation (scale bar: 100 µm).
Figure 2A:
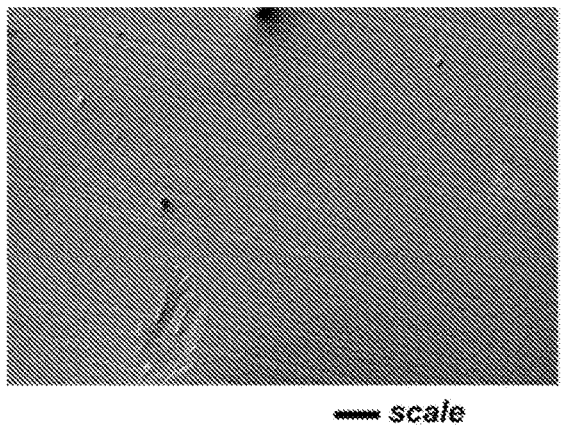
FIG. 2A is an FE-SEM micrograph of a sample containing an HNT-epoxy nanocomposite with 1 wt % UVA/HALS blend before UV irradiation (scale bar: 100 µm).
Figure 2B:
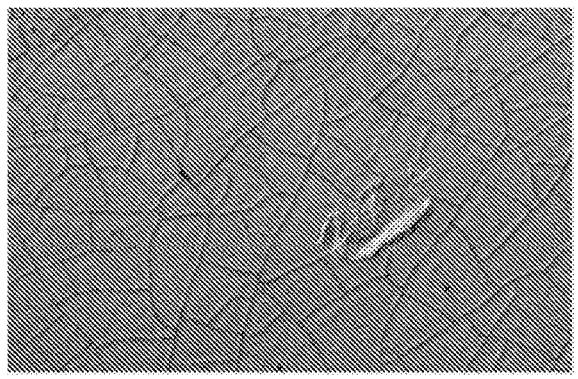
FIG. 2B is an FE-SEM micrograph of a sample containing an HNT-epoxy nanocomposite with 1 wt % UVA/HALS blend after 35 days of UV irradiation (scale bar: 100 µm).
Figure 2C:
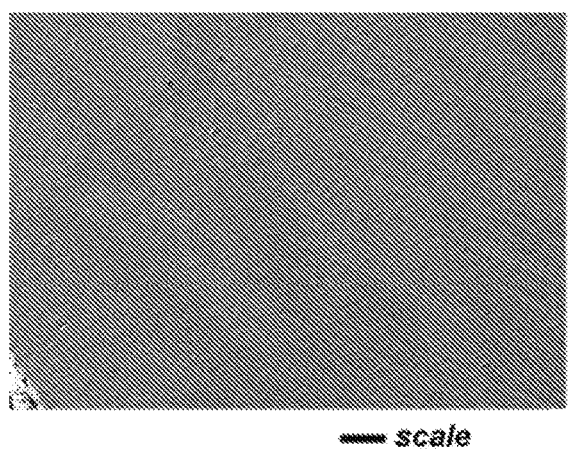
FIG. 2C is an FE-SEM micrograph of a sample containing an HNT-epoxy nanocomposite with 2 wt % UVA/HALS blend before UV irradiation (scale bar: 100 µm).
Figure 2D:
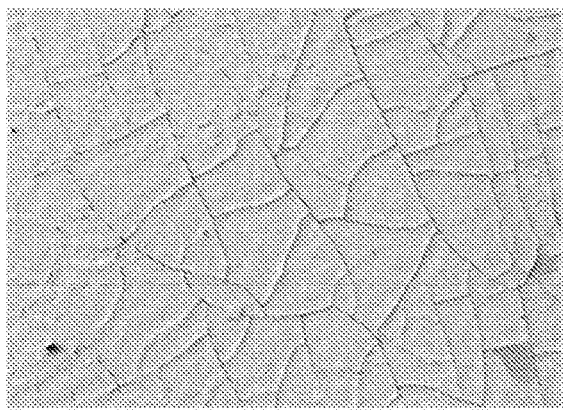
FIG. 2D is an FE-SEM micrograph of a sample containing an HNT-epoxy nanocomposite with 2 wt % UVA/HALS blend after 35 days of UV irradiation (scale bar: 100 µm).
Figure 2E:
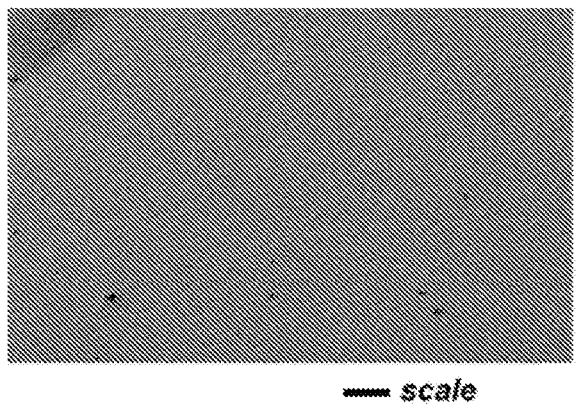
FIG. 2E is an FE-SEM micrograph of a sample containing an HNT-epoxy nanocomposite with 3 wt % UVA/HALS blend before UV irradiation (scale bar: 100 µm).
Figure 2F:
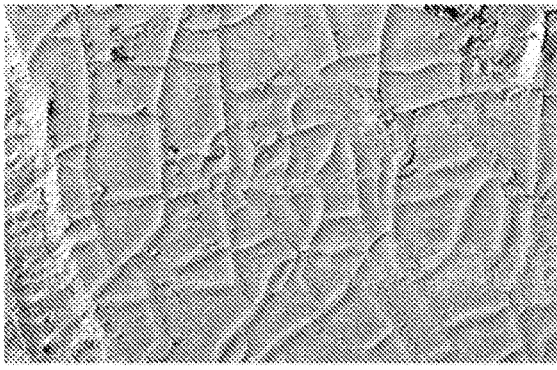
FIG. 2F is an FE-SEM micrograph of a sample containing an HNT-epoxy nanocomposite with 3 wt % UVA/HALS blend after 35 days of UV irradiation (scale bar: 100 µm).
Figure 3A:
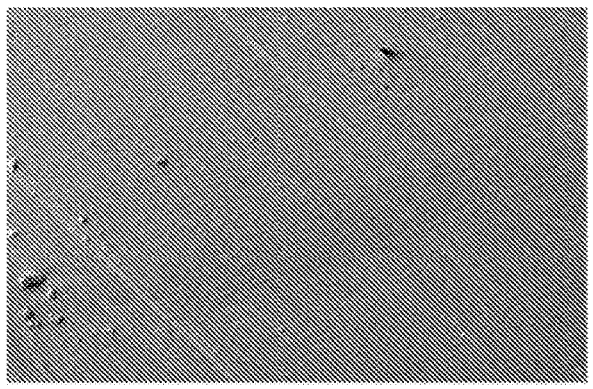
FIG. 3A is an FE-SEM micrograph of a sample containing an HNT-epoxy nanocomposite with 1 wt % lignin before UV irradiation (scale bar: 100 µm).
Figure 3B:
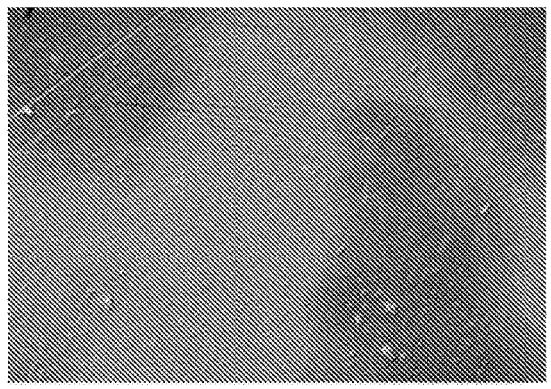
FIG. 3B is an FE-SEM micrograph of a sample containing an HNT-epoxy nanocomposite with 1 wt % lignin after 35 days of UV irradiation (scale bar: 100 µm).
Figure 3C:
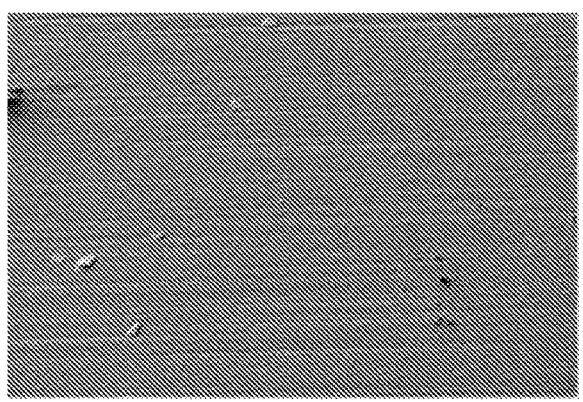
FIG. 3C is an FE-SEM micrograph of a sample containing an HNT-epoxy nanocomposite with 2 wt % lignin before UV irradiation (scale bar: 100 µm).
Figure 3D:
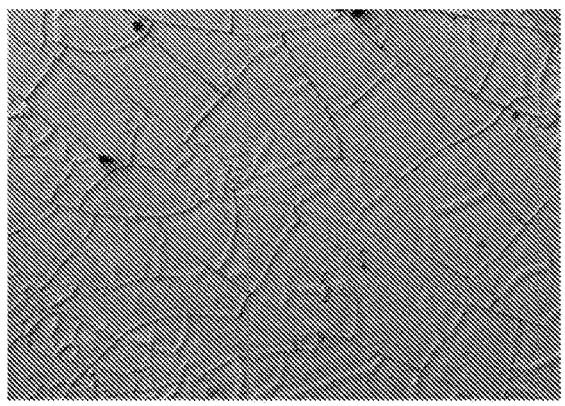
FIG. 3D is an FE-SEM micrograph of a sample containing an HNT-epoxy nanocomposite with 2 wt % lignin after 35 days of UV irradiation (scale bar: 100 µm).
Figure 3E:
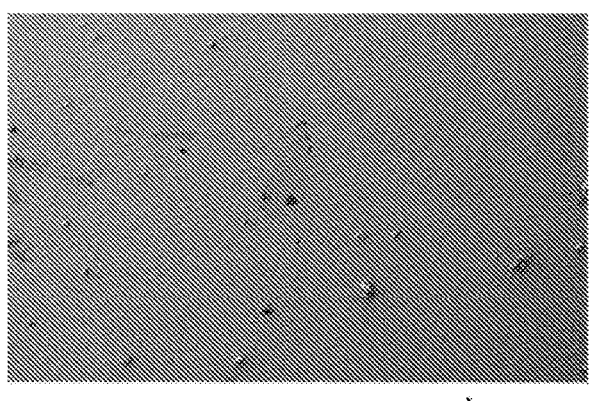
FIG. 3E is an FE-SEM micrograph of a sample containing an HNT-epoxy nanocomposite with 3 wt % lignin before UV irradiation (scale bar: 100 μm).
Figure 3F:
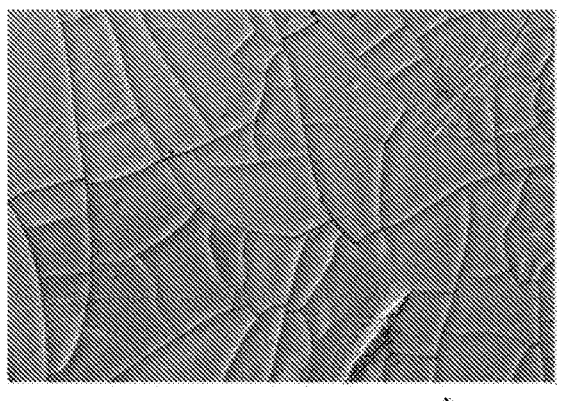
FIG. 3F is an FE-SEM micrograph of a sample containing an HNT-epoxy nanocomposite with 3 wt % lignin after 35 days of UV irradiation (scale bar: 100 μm).

FIGS. 1A-1F show FE-SEM micrographs of samples E (FIGS. 1A-1B), T (FIGS. 1C-1D), and L (FIGS. 1E-1F) before and after 35 days UV irradiation. Sample E after UV exposure degraded drastically, as evidenced by the several cracks on the surface, and the unsmooth surface itself (FIG. 1B). Without intending to be bound be theory, this result is believed to be related to the chemical decomposition of the epoxy. Samples T and L also showed cracks on the surface after UV exposure (FIGS. 1D & 1F, respectively). The number of cracks on sample T was less than that of Sample L, indicating that sample T underwent a lower degree of photodegradation.

FIGS. 2A-2F show FE-SEM micrographs of samples HNT-T1 (FIGS. 2A-2B), HNT-T2, (FIGS. 2C-2D) and HNT-T3 (FIGS. 2E-2F) after 35 days of UV irradiation. As shown, sample HNT-T2 showed the most resistance to UV light, as evidenced by the lowest number of cracks on the surface.

FIGS. 3A-3F show FE-SEM micrographs of samples: HNT-L1 (FIGS. 3A-3B), HNT-L2 (FIGS. 3C-3D), and HNT-L3 (FIGS. 3E-3F) after 35 days of UV irradiation. These images show that there were only a few cracks on sample HNT-L1 after UV irradiation, and that by increasing the lignin loaded into the HNT, the frequency of the cracks increased, indicating greater photodegradation.

It was observed that adding pristine HNT into epoxy resins does not provide good dispersion in the epoxy matrix, because the HNTs are seen on the surface. After UV irradiation, as shown in FIGS. 4A-4F, all samples prepared by pristine HNT show cracks on their surfaces, thereby confirming photodegradation.

According to SEM micrographs of all samples, samples HNT-T2 and HNT-L1 provided the best photostability against UV light, while HNT-L1 was slightly better than HNT-T2 due to the lower number of cracks.

Chemical Composition Analysis

Samples were analyzed with a Fourier transform infrared spectrophotometer in attenuated total reflectance mode (FTIR-ATR) using a Perkin Elmer, to determine the chemical changes of epoxy coatings during UV exposure. The absorbance mode was used with wavelength ranges from 400-4000 cm$^{-1}$ with 4 cm$^{-1}$ resolution and 32 scans.

Figure 5:
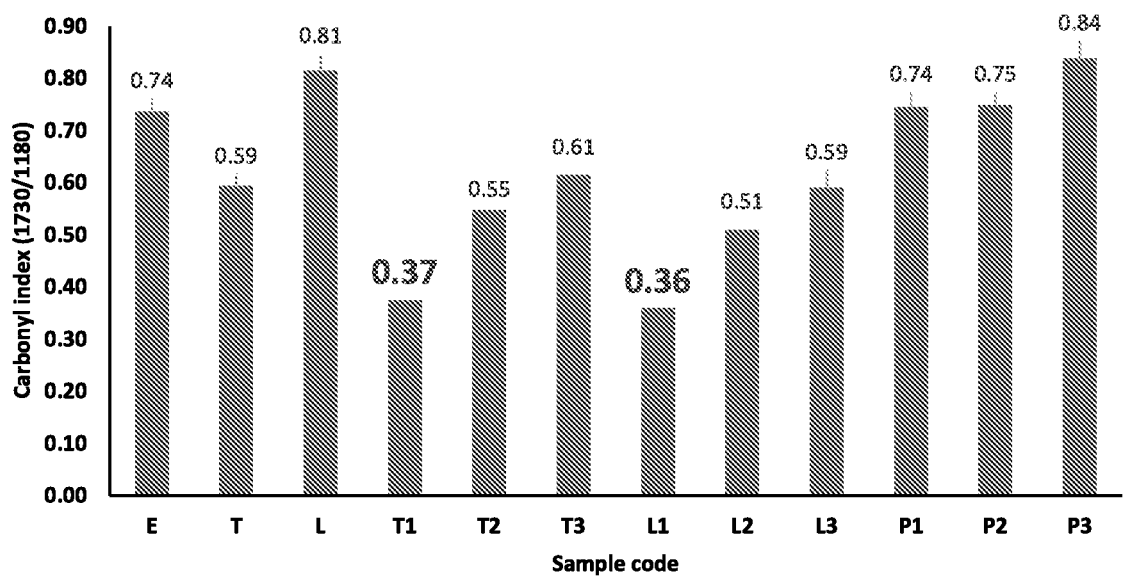
FIG. 5 is a graph of the carbonyl index of various UV stabilizer nanoparticles after 35 days.

After each week, all samples were analyzed by normalizing spectra. A carbonyl index was calculated and was used as a factor to evaluate chemical changes during UV irradiation. Carbonyl indices of different samples after 35 days of UV irradiation as described above for the weathering test are presented in FIG. 5. Sample L, which contained 2 wt % lignin had a carbonyl index of 0.81, which was incredibly high. The carbonyl indices of pure epoxy (E) and sample T were 0.74 and 0.59, respectively. The lowest carbonyl indices were demonstrated by HNT-T1 and HNT-L1 at 0.37 and 0.36, respectively. Based on these results, samples HNT-T1 and HNT-L1 degraded less than the other samples from a chemical perspective.

In various embodiments according to the disclosure, a polymer composite including the encapsulated UV stabilizer nanoparticles can have a carbonyl index after 35 days of UV irradiation as described above for the weathering test of up to 0.4, 0.45, 0.5, or 0.55 and/or at least 0.1, 0.2, or 0.3.

Morphology via SEM and TEM

To observe the morphology of the HNT samples, as well as to study the effect of HNT samples on the UV stability of epoxy coatings, epoxy samples were observed using Field Emission Scanning Electronic Microscopy (JEOL JSM 7500 F). HNT samples and epoxy nanocomposite samples were coated with iridium and gold vapors, respectively, to increase resolution for SEM observation.

A small amount of Matauri Bay (MB) HNT was dispersed in methanol and one drop of the mixture was placed into a TEM grid and heated in a vacuum oven at 50° C. for TEM analysis. Since in TEM (JEOL, JEM-2200FS), HNTs are dispersed from each other, the images were used to study morphological properties of HNT.

Figure 6A:
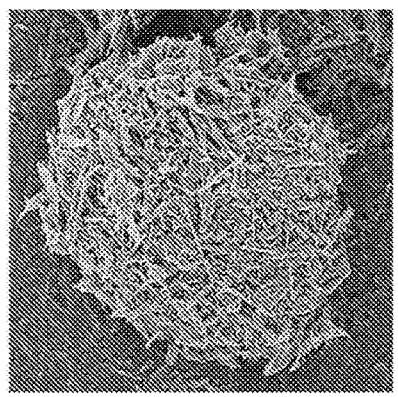
FIG. 6A is an SEM image of an HNT (pristine) at 5,000× magnification (scale bar: 1 μm).
Figure 6B:
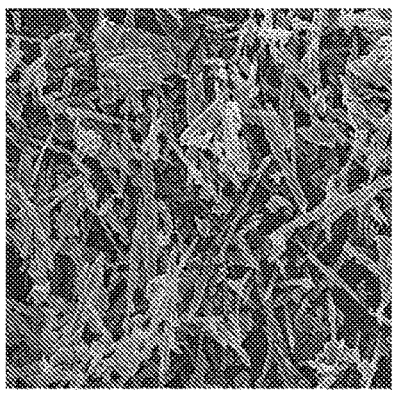
FIG. 6B is an SEM image of an HNT (pristine) at 10,000× magnification (scale bar: 1 μm).
Figure 6C:
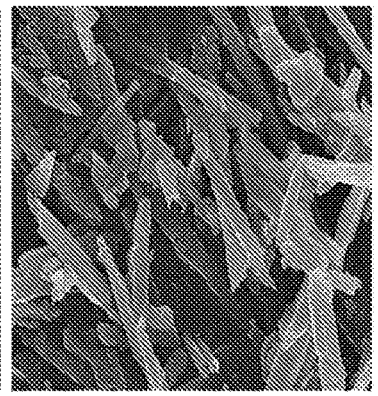
FIG. 6C is an SEM image of an HNT (pristine) at 35,000× magnification (scale bar: 0.1 μm).
Figure 6D:
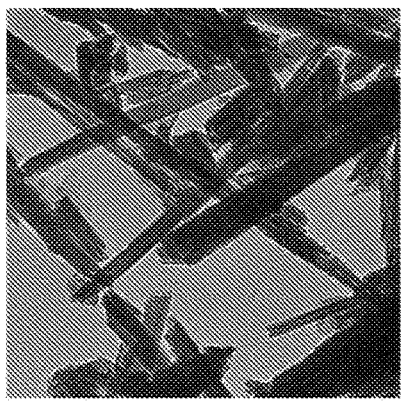
FIG. 6D is a TEM image of an HNT (pristine) (scale bar: 0.2 μm).
Figure 6E:
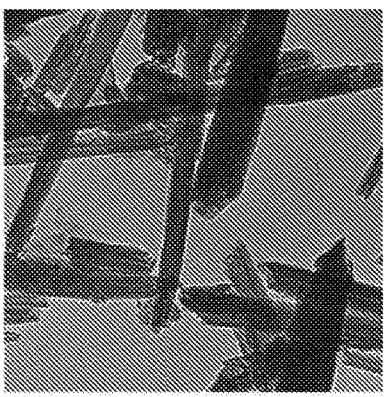
FIG. 6E is a TEM image of an HNT (pristine) (scale bar: 0.2 μm).
Figure 6F:
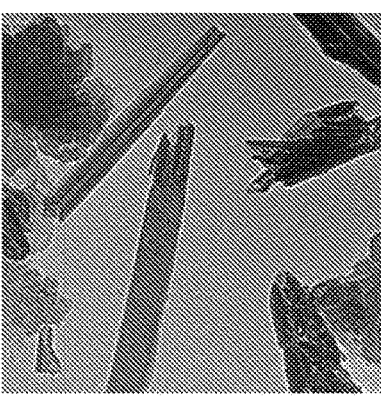
FIG. 6F is a TEM image of an HNT (pristine) (scale bar: 0.1 μm).

FIGS. 6A-6C show SEM images and FIGS. 6D-6F show TEM images of HNT with different magnifications. MB-HNTs generally included short and stubby tubes with lengths of 100 nm to 3 μm while some long and thin tubes were also observed. As shown in these images, the HNTs were packed together and form a nest shape. The morphological characteristics of HNTs are presented in Table 2, below. The particle shape was tubular and the inner and outer diameters were 15-70 nm and 50-200 nm, respectively. The chemical composition was based on $Al_2Si_2O_5(OH)_4$.

TABLE 2

Morphological characterization of HNT sample

| HNT Type | Dominant Particle Shape | Length (nm) | Inner diameter (nm) | Outer diameter (nm) | Aspect Ratio (L/D) | Empirical Formula |
|---|---|---|---|---|---|---|
| Matauri Bay (MB) | Tubular | 100-3000 | 15-70 | 50-200 | 12 | $Al_2Si_2O_5(OH)_4$ |

There were different types of HNTs, such as patch (PT), Matauri Bat (MB), Dragonite (DG), and Camel Lake (CLA). The surface area of MB HNT was 22.10 m²/g, and had a shorter length than the others.

Loading Determination—Chemical Composition

To determine how much lignin and organic UV stabilizers were loaded into the HNTs, thermogravimetric analysis (TGA) was used from 30-800° C. with a scanning rate of 10° C./min under a nitrogen flow of 25 mL/min for sample and 10 mL/min for balance (TGA Analysis, Q50).

TGA was used to find how much UVA/HALS and lignin were loaded into the HNT. Five samples including (1) pristine HNT, (2) the UVA/HALS blend, (3) the lignin, (4) UVA/HALS blend loaded into HNT (T-HNT), and (5) lignin loaded into HNT (L-HNT) were tested by TGA. Since thermal stability of UVA/HALS and lignin is much lower than pristine HNT due to the mineral structure of HNT, the residual amount of loaded HNT samples was lower than pristine HNT, in a manner proportional to the amount of loaded sample. The results of TGA analyses are summarized in Table 3, below.

TABLE 3

Amounts of UVA/HALS and Lignin trapped in HNT

| Sample | Residual (%) at 800° C. | Amount of Loading in HNT (%) |
|---|---|---|
| Pristine HNT | 80.5 ± 0.5 | — |
| UVA/HALS blend | 1.60 ± 0.05 | — |
| Lignin | 0.20 ± 0.02 | — |
| T-HNT | 68.1 ± 0.3 | 10.8 ± 0.2 |
| L-HNT | 67.0 ± 0.3 | 13.3 ± 0.4 |

As shown in Table 3, the residual amount of pristine HNT at 800° C. was 80.5%. The residual amounts of HNT loaded with UVA/HALS blend and lignin were 68.1% and 67.0%, respectively. These data show that 10.8% of UVA/HALS blend and 13.3% of lignin were loaded into the HNT.

Loading Determination—Structural Composition

To chemically confirm loading of UVA/HALS blend and lignin into the HNTs, x-ray photoelectron spectroscopy (XPS) analysis was performed. X-ray diffraction (XRD) was performed to show that the loading process does not change the structure of HNT.

Pristine HNT includes oxygen, aluminum, and silicon in its composition, while the UVA/HALS blend also contains nitrogen. Additionally, by loading lignin into HNT, the amount of carbon and oxygen should be increased significantly due to the high amount of carbon (~60%) and oxygen (~35%) in lignin. The results of the XPS analyses are shown in Table 4, below.

TABLE 4

XPS Results of different HNT samples

| Sample | C % | O % | Al % | Si % | N % |
|---|---|---|---|---|---|
| Pristine HNT | 31.11 | 43.02 | 6.91 | 18.96 | — |
| T-HNT | 55.95 | 30.06 | 3.64 | 8.15 | 2.19 |
| L-HNT | 61.17 | 28.88 | 1.57 | 8.39 | — |

The presence of carbon in the pristine HNT likely indicated contamination of the surface. The presence of nitrogen in T-HNT confirmed that the loading of UVA/HALS blend was successful, as only UVA/HALS has nitrogen in its structure. Moreover, for L-HNT, there were two increases—i.e., in the amount of carbon and in the total amount of carbon and oxygen—which confirmed the addition of lignin.

The XRD spectra (not shown) of these three samples indicated two diffraction peaks at $2\Theta=12.2°$ and $20.1°$, which correspond to the 001 and 101 planes, respectively. These diffractions of HNT were attributed to its tubular morphology, a higher degree of disorder, small crystal size, and interstratifications of the layer with various hydration states. As the main peaks of HNT were still present in the T-HNT and L-HNT samples, it was demonstrated that the structure of the HNT did not change after the loading process. After loading, the intensity and sharpness of some of the peaks decreased, which could have been related to the incorporation of the UVA/HALS and lignin, as each of these components are amorphous and can decrease the crystallinity of the HNT.

Color Change Determination

After each week, the color changes of specimens due to UV exposure according to the weathering procedure above were measured by spectrophotometry. The L*a*b color space before and after 35 days of UV irradiation was measured using a spectrophotometer (CM-2300d-Konica Minolta) in SCE mode to study the effect of UV light on the color change of epoxy coatings and total color difference ($\Delta E^*$) according to equation 1:

$$\Delta E^* = \sqrt{((\Delta L^*)^2 + (\Delta a^*)^2 + (\Delta b^*)^2)} \quad (1)$$

Figure 7:
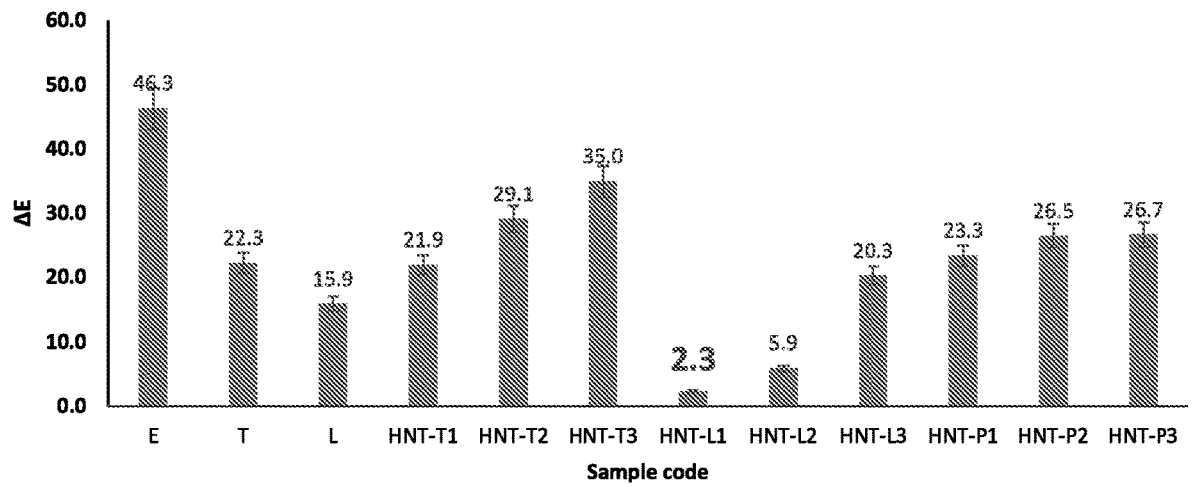
FIG. 7 is a graph of the ΔE (color changes) for various UV stabilizer nanoparticles after 35 days of UV irradiation.

The UV protection efficiency of prepared samples was evaluated by color measurement before and after UV exposure according to the weathering procedure above. The occurrence of color changes in epoxy coatings comes from the increasing number of chromophores produced during UV irradiation. The changes of color difference ($\Delta E^*$) according to the L*a*b color scale, described above, are shown in FIG. 7. These results demonstrated that pure epoxy (E) had the highest color change ($\Delta E^*=46.3$), while that of the UVA/HALS blend (T), containing 2 wt % organic stabilizer, was 22.3. Even though $\Delta E^*$ for the lignin (L) was only 15.9, this sample was not necessarily more photostable. Rather, it was believed that the color change was low due to the dark color of the sample. Upon addition of 1 wt % of the UVA/HALS blend (HNT-T1), $\Delta E^*$ decreased to 21.9, indicating greater photostability. The $\Delta E^*$ for each of HNT-L1 and HNT-L2 were 2.3 and 5.9, respectively, demonstrating that these samples have the highest color stability among all samples, even greater than sample T, which contained commercial organic UV stabilizer.

Figure 8:
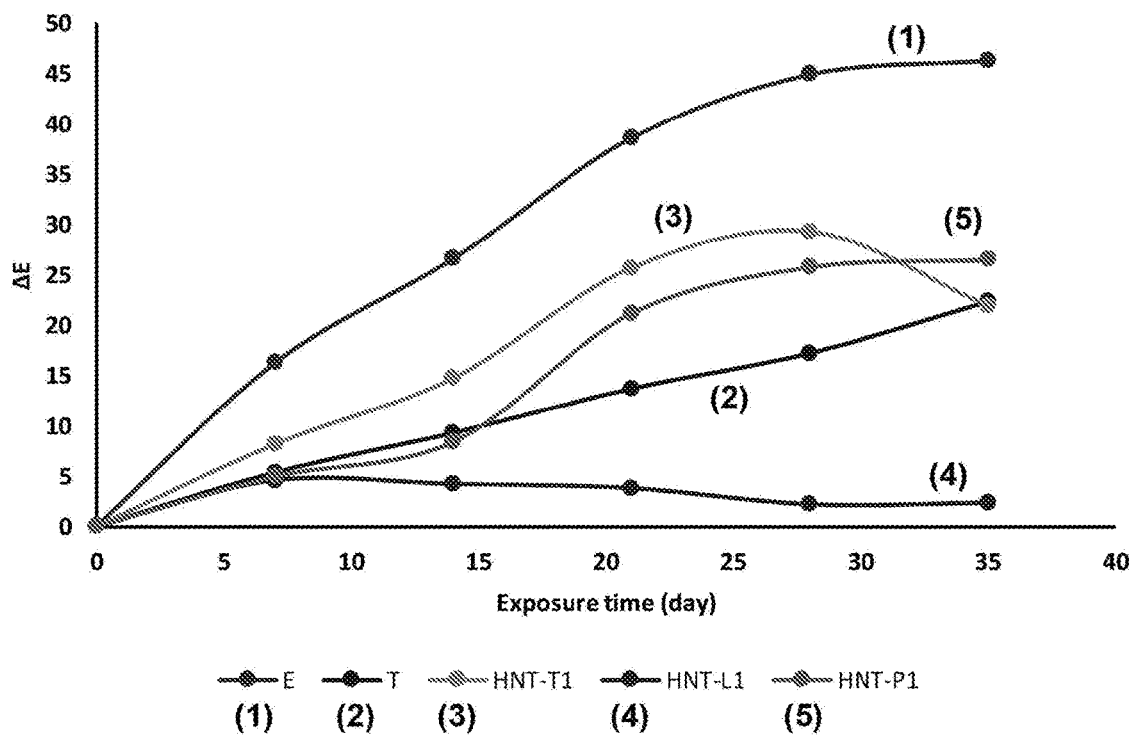
FIG. 8 is a graph of the ΔE (color changes) for various UV stabilizer nanoparticle compositions over UV exposure time.

FIG. 8 illustrates ΔE* of several samples (E, T, HNT-T1, HNT-L1, and HNT-P1) over time. The ΔE* for samples E, T, and P-HNT-1 increased over time, and the ΔE* for sample E was much higher than that for samples T and HNT-P1. Notably, the ΔE* of HNT-T1 and HNT-L1 initially increased in the first week of UV irradiation, but that of HNT-L1 proceeded to decreased over the next weeks. For HNT-T1, ΔE* decreased in the last week of irradiation. Without intending to be bound by theory, this behavior may be related to photocatalytic effects caused by direct contact between HNTs and the epoxy matrix after absorbing UV radiation.

In various embodiments according to the disclosure, a polymer composite including the encapsulated UV stabilizer nanoparticles can have a ΔE* value after 35 days of UV irradiation as described above for the weathering test of up to 5, 8, 10, 15, 20, 25, or 30 and/or at least 0.1, 1, 2, 5, 8, 10, or 15.

Evaluation of Free Radical Concentration by EPR

Electron paramagnetic resonance (EPR) experiments were carried out on small slices of epoxy samples with a 0.9 mm thickness at X-band, ca. 9.6 GHz, on a Bruker E-680X spectrometer equipped with a SHQE-W1 resonator. To keep temperature constant, a low pressure nitrogen gas flow through the resonator was applied without removing ambient oxygen. Continuous wave (CW) EPR spectra were detected under non-saturating conditions with 0.5 mW incident microwave power, a microwave frequency of 9.87 GHz, a magnetic field modulation with an amplitude of 0.4 mT and 100 kHz frequency, and a data conversion time of 163 ms. Three scans were gathered. For in situ EPR experiments, all samples were irradiated by a UVC lamp (25 W) for 5 min. The optical fiber of the lamp was adjusted in front of an EPR resonator 2 cm from the sample probe to provide better resolution. Double integration of the first derivative CW EPR spectra was used to determine the number of radical centers in each sample, with each one preceded by a first-order polynomial baseline correction.

Figure 9:
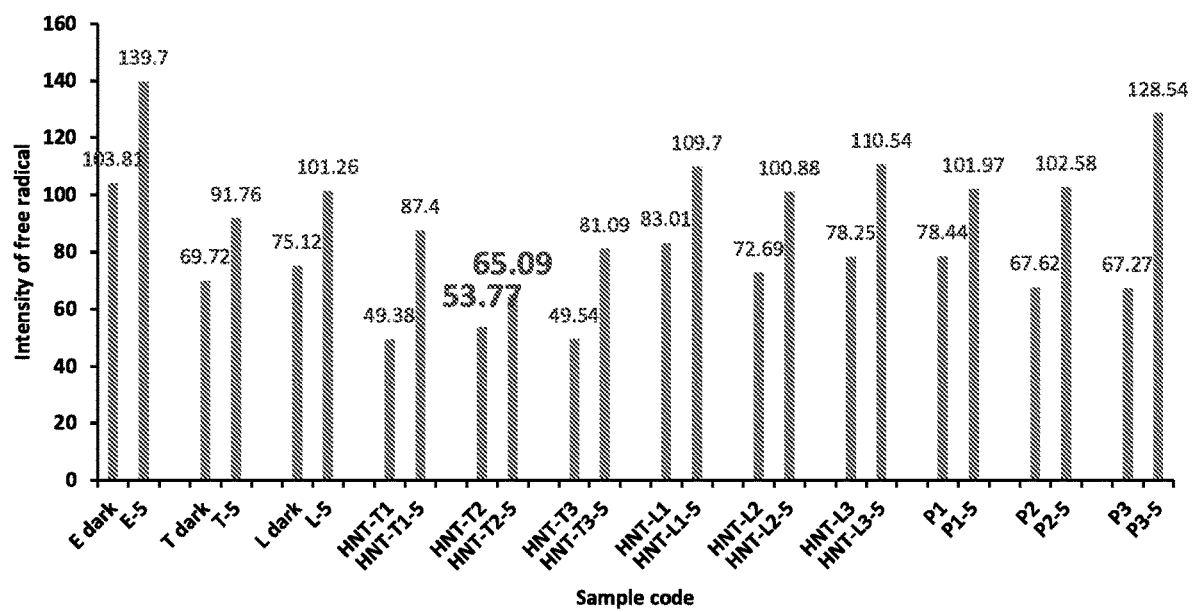
FIG. 9 is a graph of the intensity of free radicals for various UV stabilizer nanoparticle compositions before and after 5 minutes of UVC irradiation.

Various levels of EPR signal intensity, which is directly related to the free radical concentration, were provided from the epoxy samples. The g factor of pure epoxy (E) was approximately 1.8. After 5 minutes of UV irradiation, the EPR signal intensity of E was enhanced significantly without any shift. In samples HNT-L1 and HNT-T2, after 5 minutes irradiation, the EPR signal intensity did not change significantly. EPR signal intensities of all samples before and after 5 minutes of UV irradiation are shown in FIG. 9. Sample HNT-T2 had the lowest change in free radical concentration before and after 5 minutes UV irradiation. The sample which contained lignin showed a large increase in radical intensity due to the generation of phenoxy/semiquinone radicals from lignin.

Glass Transition Temperature ($T_g$) Determination

When UV light is exposed to polymer materials, the $T_g$ increases due to the formation of polar groups (e.g., carbonyls) that hinder chain movements. Therefore, the $T_g$ is increased, although the polymer chains are broken.

DSC was used to measure $T_g$ of epoxy samples during different times of UV radiation (DSC 6000, PerkinElmer). For each sample, 7-10 mg of epoxy sample was placed in an aluminum pan and $T_g$ was measured at a temperature range of 10-180° C. under a nitrogen flow of 40 mL/min and a heating rate of 10° C./min.

The $T_g$ values of all samples before and after 35 days of UV irradiation are shown in Table 5, below.

| Sample | $T_g$ ° C. (T = 0 d) | $T_g$ ° C. (T = 35 d) | $\Delta T_g$ |
|---|---|---|---|
| E | 53.1 | 60.5 | 7.4 |
| T | 51.3 | 58.2 | 6.9 |
| L | 53.5 | 60.3 | 6.8 |
| HNT-T1 | 53.6 | 58.9 | 5.3 |
| HNT-T2 | 56.1 | 62.6 | 6.5 |
| HNT-T3 | 59.8 | 63.5 | 3.7 |
| HNT-L1 | 57.6 | 60.4 | 2.8 |
| HNT-L2 | 58.2 | 60.8 | 2.3 |
| HNT-L3 | 59.7 | 60.9 | 1.2 |
| HNT-P1 | 57.1 | 61.0 | 3.9 |
| HNT-P2 | 57.3 | 62.8 | 5.5 |
| HNT-P3 | 59.6 | 62.7 | 3.1 |

As shown in the table, pure epoxy (E) had the highest change in the glass transition temperature, indicative of photodegradation. When organic UV absorbers were added to sample T, the glass transition temperature decreased, while in sample L (where 2 wt % lignin was added to the epoxy system), the glass transition temperature increased. In all samples to which HNT was added, $T_g$ increased due to the effect of adding inorganic material into the polymer matrix. Sample HNT-L1, HNT-L2, and HNT-L3 showed small changes in the amount of $\Delta T_g$ which suggested low degree of photodegradation in these samples. Additionally, $\Delta T_g$ for sample HNT-T1 was lower than that for sample T, indicating that the polymer chains of sample HNT-T1 after 35 days of UV exposure changed less than sample T.

In various embodiments according to the disclosure, a polymer composite including the encapsulated UV stabilizer nanoparticles can have a $\Delta T_g$ value after 35 days of UV irradiation as described above for the weathering test of up to 2, 2.5, 3, 4, 5, or 6° C. and/or at least 0.1, 1, 1.5, 2, 2.5, or 3° C.

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the compositions, compounds, articles, methods, and processes are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

What is claimed is:

1. A polymer composite comprising:
   a polymer matrix; and
   a plurality of encapsulated UV stabilizer nanoparticles distributed throughout the polymer matrix, each nanoparticle comprising:
   a nanotube encapsulating body having a cylindrical body defining an interior cylindrical volume; and
   a UV stabilizing material within the interior cylindrical volume of the encapsulating body, the UV stabilizing material comprising a biomass material comprising a phenolic functional group.

2. The composite of claim 1, wherein the nanotube encapsulating body comprises a nanotube material selected from the group consisting of halloysite nanotubes, carbon nanotubes, silicon nanotubes, boron-carbon-nitride nanotubes, boron-nitride nanotubes, and combinations or mixtures thereof.

3. The composite of claim 1, wherein the nanotube encapsulating body has (i) an internal diameter in a range from 10 nm to 100 nm, (ii) an outer diameter in a range from 40 nm to 400 nm, and (iii) a length in a range from 0.1 µm to 10 µm.

4. The composite of claim 1, wherein the biomass material comprising a phenolic functional group comprises lignin.

5. The composite of claim 1, wherein the biomass material comprising a phenolic functional group comprises a biomass extractive.

6. The composite of claim 1, the UV stabilizing material is present in an amount in a range of 1 wt. % to 20 wt. % relative to the nanoparticles.

7. The composite of claim 1, wherein the polymer matrix comprises a thermoset material.

8. The composite of claim 7, wherein the thermoset comprises an epoxy thermoset.

9. The composite of claim 1, wherein the polymer matrix comprises a thermoplastic material.

10. The composite of claim 1, wherein the polymer composite further comprises one or more additives selected from the group consisting of non-nanotubular nanoclay, graphene oxide, graphene, silicon dioxide (silica), aluminum oxide, cellulose nanocrystals, carbon nanotubes, titanium dioxide (titania), diatomaceous earth, biocides, pigments, dyes, thermoplastics, and combinations thereof.

11. The composite of claim 1, wherein the encapsulated UV stabilizer nanoparticles are present in an amount in a range of 0.1 wt. % to 10 wt. % relative to the polymer composite.

12. A coated article comprising:
    a substrate; and
    a polymer composite according to claim 1, coated on a surface of the substrate.

13. The coated article of claim 12, wherein the substrate is selected from the group of metal, plastics, glass, wood, fabric, and ceramics.

14. The coated article of claim 12, wherein the polymer composite has a thickness ranging from 10 µm to 1000 µm.

15. The composite of claim 1, wherein:
    the nanotube encapsulating body comprises halloysite nanotubes;
    the nanotube encapsulating body has (i) an internal diameter in a range from 10 nm to 100 nm, (ii) an outer diameter in a range from 40 nm to 400 nm, and (iii) a length in a range from 0.1 µm to 10 µm;
    the biomass material comprising a phenolic functional group comprises lignin;
    the UV stabilizing material is present in an amount in a range of 1 wt. % to 20 wt. % relative to the nanoparticles; and
    the encapsulated UV stabilizer nanoparticles are present in an amount in a range of 0.1 wt. % to 10 wt. % relative to the polymer composite.

* * * * *